US012233580B2

(12) United States Patent
Kim et al.

(10) Patent No.: US 12,233,580 B2
(45) Date of Patent: Feb. 25, 2025

(54) METHOD OF MANUFACTURING A WINDOW MEMBER OF A DISPLAY DEVICE

(71) Applicant: SAMSUNG DISPLAY CO., LTD., Yongin-si (KR)

(72) Inventors: Youngdo Kim, Yongin-si (KR); Hyunseok Oh, Yongin-si (KR); Kangwoo Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 414 days.

(21) Appl. No.: 17/501,022

(22) Filed: Oct. 14, 2021

(65) Prior Publication Data

US 2022/0305702 A1 Sep. 29, 2022

(30) Foreign Application Priority Data

Mar. 29, 2021 (KR) .................. 10-2021-0040507

(51) Int. Cl.
*B29C 43/18* (2006.01)
*B29C 43/32* (2006.01)
*B29C 43/56* (2006.01)
*B29L 31/34* (2006.01)

(52) U.S. Cl.
CPC ...... *B29C 43/18* (2013.01); *B29C 2043/3205* (2013.01); *B29C 2043/563* (2013.01); *B29L 2031/3475* (2013.01)

(58) Field of Classification Search
CPC ............ B29C 43/18; B29C 2043/3205; B29C 2043/563
See application file for complete search history.

(56) References Cited

U.S. PATENT DOCUMENTS

| 7,102,726 | B2  |   | 9/2006  | Byun et al.              |
|-----------|-----|---|---------|--------------------------|
| 9,069,521 | B2  | * | 6/2015  | Lee ............... G09F 9/301 |
| 9,354,476 | B2  | * | 5/2016  | Han ............... G06F 1/1616 |
| 9,364,476 | B2  |   | 5/2016  | Han et al.               |
| 9,809,012 | B2  | * | 11/2017 | Xie ............... G06F 3/041 |
| 9,983,424 | B2  | * | 5/2018  | Kim ............... H10K 50/84 |
| 10,020,462| B1  |   | 7/2018  | Ai et al.                |

(Continued)

FOREIGN PATENT DOCUMENTS

CA    3031869    *  2/2018
JP    2002-368082    12/2002

(Continued)

*Primary Examiner* — Edmund H Lee
(74) *Attorney, Agent, or Firm* — CHAU & ASSOCIATES, LLC

(57) ABSTRACT

A device for manufacturing a window member includes a chamber, a pressure adjustment pump connected to the chamber and configured to adjust an internal pressure of the chamber, a support configured to support a base substrate, the base substrate having a plurality of trenches of which a lengthwise direction is a first direction and an auxiliary film that surrounds at least a portion of the base substrate, a dispenser configured to provide a soft material to one side of the base substrate, a pressurizer disposed within the chamber and configured to apply pressure to the base substrate as the pressurizer moves, a curing machine configured to generate a protective layer by curing the soft material, and a cutting machine configured to cut at least a portion of the protective layer.

18 Claims, 20 Drawing Sheets

(56) References Cited

U.S. PATENT DOCUMENTS

| | | |
|---|---|---|
| 10,355,241 B2 | 7/2019 | Ahn et al. |
| 2013/0002572 A1* | 1/2013 | Jin .................. G06F 1/1637 |
| | | 345/173 |
| 2019/0300424 A1 | 10/2019 | Jeong et al. |
| 2021/0107826 A1 | 4/2021 | Hwang et al. |

FOREIGN PATENT DOCUMENTS

| | | | |
|---|---|---|---|
| KR | 10-0741902 | | 7/2004 |
| KR | 20100060452 | * | 6/2010 |
| KR | 101037334 | * | 5/2011 |
| KR | 10-1266305 | | 5/2013 |
| KR | 10-2015-0017819 | | 2/2015 |
| KR | 10-2018-0070784 A | | 6/2018 |
| KR | 10-2018-0079093 | | 7/2018 |
| KR | 10-1918444 | | 11/2018 |
| KR | 10-2019-0116147 | | 10/2019 |
| KR | 10-2109385 | | 5/2020 |
| KR | 10-2111138 | | 5/2020 |

\* cited by examiner

II-II'

METHOD OF MANUFACTURING A WINDOW MEMBER OF A DISPLAY DEVICE

CROSS-REFERENCE TO RELATED APPLICATION

This application is based on and claims priority under 35 U.S.C. § 119 to Korean Patent Application No. 10-2021-0040507, filed on Mar. 29, 2021, in the Korean Intellectual Property Office, the disclosure of which is herein incorporated by reference in its entirety.

TECHNICAL FIELD

The present disclosure relates to a window member for a display device and, more particularly, to a device for manufacturing a window member and a method of manufacturing the same.

DISCUSSION OF THE RELATED ART

Electronic devices such as smartphones, digital cameras, notebook computers, satellite navigation systems, and smart televisions include display devices for displaying images. Display devices generally include a display panel that generates and displays an image, and a window that is disposed over the display panel and protects the display panel.

Applications of conventional display devices have diversified. Moreover, since display devices have become thinner and lighter, their range of use has increased. Flexible display panels have recently been developed. Flexible display panels are display panels that may be bent, folded, stretched, and/or rolled, either once during manufacturing, or repeatedly during use, without cracking or otherwise being damaged. Each component in flexible display panels may be formed of a flexible material such as plastic.
Windows applied to flexible display panels may be hard to protect the flexible display panels from external impacts and may also be flexible.

SUMMARY

A device for manufacturing a window member includes a chamber, a pressure adjustment pump connected to the chamber and configured to adjust an internal pressure of the chamber, a support configured to support a base substrate, the base substrate having a plurality of trenches of which a lengthwise direction is a first direction and an auxiliary film that surrounds at least a portion of the base substrate, a dispenser configured to provide a soft material to one side of the base substrate, a pressurizer disposed within the chamber and configured to moving relative to the base substrate, in the first direction and apply pressure to the base substrate as the pressurizer moves, a curing machine configured to generate a protective layer by curing the soft material, and a cutting machine configured to cut at least a portion of the protective layer.

The auxiliary film may have an opening that at least partially surrounds the base substrate, the opening may include a center area overlapping the base substrate, and a first auxiliary area extending from the center area in a second direction, and an angle between the first direction and the second direction may be equal to or greater than 0° and less than 90°.

The opening may further include a second auxiliary area extending from the center area in a third direction intersecting the second direction, and an angle between the first direction and the third direction may be greater than 0° and less than 90°.

A thickness of the auxiliary film may be equal to or greater than a thickness of the base substrate.

A refractive index of the soft material may be substantially the same as a refractive index of the base substrate.

A method of manufacturing a window member includes disposing, on a support, a base substrate having a first surface in which a plurality of trenches are formed, a lengthwise direction of the plurality of trenches being a first direction, disposing a first soft material onto one side of the first surface of the base substrate, filling the plurality of trenches with the first soft material by moving a pressurizer in the first direction under a vacuum, and forming a first protective layer on the base substrate by curing the first soft material.

The method may further include disposing an auxiliary film on the support, the auxiliary film may surround at least a portion of the base substrate.

The auxiliary film may have an opening that at least partially surrounds the base substrate, the opening may include a center area overlapping the base substrate, and a first auxiliary area extending from the center area in a second direction, and an angle between the first direction and the second direction may be equal to or greater than 0° and less than 90°.

The opening may further include a second auxiliary area extending from the center area in a third direction intersecting the second direction, and an angle between the first direction and the third direction may be greater than 0° and less than 90°.

A thickness of the auxiliary film may be equal to or greater than a thickness of the base substrate.

The first direction may be parallel to the first surface of the base substrate.

The filling of the plurality of trenches with the first soft material may include disposing an auxiliary substrate between the base substrate and the pressurizer, bringing into contact with the first soft material one side of a first surface of the auxiliary substrate facing the first surface of the base substrate, and moving the pressurizer from the one side of the first surface of the auxiliary substrate in the first direction on the auxiliary substrate.

While the pressurizer is moving in the first direction, an angle between the first surface of the auxiliary substrate and the first surface of the base substrate may decrease.

The curing of the first soft material may include exposing the first soft material to ultraviolet light and/or heating the first soft material.

The method may further include cutting at least a portion of the first protective layer.

The method may further include forming a second protective layer on the first protective layer.

A refractive index of the first protective layer may be substantially the same as a refractive index of the base substrate.

A length of each of the plurality of trenches in the first direction may be less than or equal to a width of the base substrate in the first direction.

A depth of each of the plurality of trenches may be less than or equal to a thickness of the base substrate.

A first non-folding area, a second non-folding area, and a folding area disposed between the first non-folding area and the second non-folding area may be defined in the base substrate, and the plurality of trenches may be located in the folding area.

A method of manufacturing a window member of a display device, the method includes evacuating a chamber, depositing a fluid material onto a substrate within the chamber pressing the fluid material over a top surface of the substrate to fill a plurality of trenches of the top surface of the substrate with the fluid material, and curing the fluid material.

The pressing may be performed by a roller that is rolled across the top surface of the substrate.

The curing may be performed by exposing the fluid material to light and/or heat.

BRIEF DESCRIPTION OF THE DRAWINGS

The above and other aspects and features of certain embodiments of the disclosure will be more apparent from the following description taken in conjunction with the accompanying drawings, in which.

DETAILED DESCRIPTION

Figure 1:
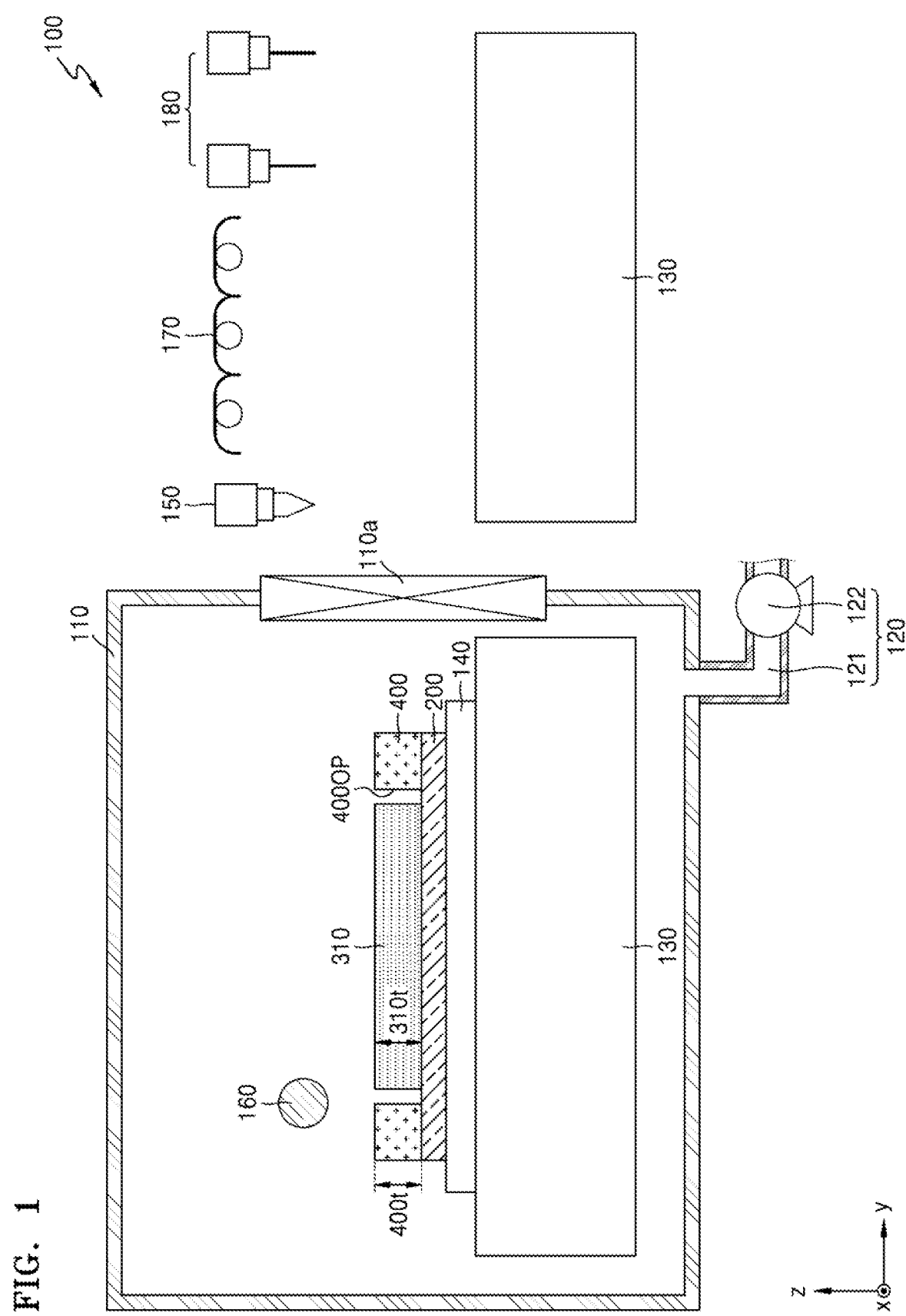
FIG. 1 is a schematic cross-sectional view of a device for manufacturing a window member, according to an embodiment of the disclosure.

Reference will now be made in detail to embodiments, examples of which are illustrated in the accompanying drawings, wherein like reference numerals may refer to like elements throughout the specification and drawings. In this regard, the present embodiments may have different forms and should not necessarily be construed as being limited to the descriptions set forth herein. As used herein, the term "and/or" includes any and all combinations of one or more of the associated listed items.

It will be understood that although the terms "first," "second," etc. may be used herein to describe various components, these components should not be limited by these terms. These components are only used to distinguish one component from another.

As used herein, the singular forms "a," "an," and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

It will be understood that when a layer, region, or component is referred to as being "formed on" another layer, region, or component, it can be directly or indirectly formed on the other layer, region, or component. That is, for example, intervening layers, regions, or components may be present.

Sizes of elements in the drawings may be exaggerated for convenience of explanation.

When a certain embodiment may be implemented differently, a specific process order may be performed differently from the described order. For example, two consecutively described processes may be performed substantially at the same time or performed in an order opposite to the described order.

In the present specification, "A and/or B" represents A or B, or A and B. The expression "at least one of A and B" indicates only A, only B, both A and B, or variations thereof.

It will also be understood that when a layer, region, or component is referred to as being "connected" or "coupled" to another layer, region, or component, it can be directly connected or coupled to the other layer, region, or/and component or intervening layers, regions, or components may be present. For example, when a layer, region, or component is referred to as being "electrically connected" or "electrically coupled" to another layer, region, or component, it can be directly electrically connected or coupled to the other layer, region, and/or component or intervening layers, regions, or components may be present.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

FIG. 1 is a schematic cross-sectional view of a device for manufacturing a window member, according to an embodiment of the disclosure.

Referring to FIG. 1, a device 100 for manufacturing a window member may include a chamber 110, a pressure adjuster 120 (e.g., a vacuum pump), a support 130, a moving unit 140 (e.g., an actuated stage), a dispenser 150 (e.g., a nozzle), a pressurizer 160 (e.g., a cylindrical roller), a curing machine 170 (e.g., a heating element or light source), and a cutting machine 180 (e.g., a blade or laser cutting device).

The chamber 110 may have a space formed therein, and a portion thereof may have an opening. A gate valve 110a may be disposed in the opening of the chamber 110, and may selectively open or close the opening of the chamber 110. Although the one gate valve 110a is disposed in the chamber 110 in FIG. 1, one or more gate valves 110a may be installed. For example, two gate valves 110*a* may be installed in the chamber 110. The two gate valves 110*a* may face each other.

The pressure adjuster 120 may be connected to the chamber 110 and may adjust internal pressure of the chamber 110 to create a vacuum within the pressure chamber 110 or to allow the chamber to have a pressure that is similar to atmospheric pressure. The pressure adjuster 120 may include a connection pipe 121 connected to the chamber 110, and a pressure adjusting pump 122 provided on the connection pipe 121.

The support 130 may be internally and/or externally disposed within the chamber 110. For example, granite surface plate may be used as the support 130. As another example, the support 130 may include a metal material, a porous material, or the like.

The support 130 may support the moving unit 140 to which a carrier film 200 or the like is attached. The support 130 may include rails, and the moving unit 140 may move along the rails. The moving unit 140 may move in a straight line without being inclined, through the rails. For example, the moving unit 140 may move in a y direction.

The moving unit 140 may include a linear motor system (LMS) magnet and a magnetic body. A linear motor may be configured by coupling the LMS magnet with the magnetic body, and the moving unit 140 may be moved in the y direction by the linear motor. For example, the magnetic body may be a coil. When the moving unit 140 moves along the rails, the moving unit 140 may move through a magnetic levitation wireless charging system. The moving unit 140 may include a posture adjuster that changes the positions of the carrier film 200, a base substrate 310, an auxiliary film 400, and the like or finely adjusts the position of the moving unit 140. However, the moving unit 140 is not necessarily limited to this arrangement and any actuated stage may be used.

The carrier film 200, the base substrate 310, and the auxiliary film 400 may be on the moving unit 140. In FIG. 1, both the carrier film 200 and the auxiliary film 400 are on the moving unit 140. However, at least one of the carrier film 200 and the auxiliary film 400 may be omitted. For example, the auxiliary film 400 may be omitted.

The carrier film 200 may protect a surface of the base substrate 310. For example, as shown in FIG. 1, the carrier film 200 may be disposed below the base substrate 310 and may protect a lower surface of the base substrate 310.

The carrier film 200 may include plastic. For example, the carrier film 200 may include polyethylene terephthalate (PET), polyimide (PI), polyamide-imide (PAI), polypropylene (PP), polystyrene (PS), or the like. As an example, the carrier film 200 may be a glass. For example, the carrier film 200 may include an ultra-thin glass. As used herein, the phrase "ultra-thin glass" may mean glass that is thinner than or equal to 2 mm, glass that is thinner than or equal to 1 mm, or glass that is thinner than or equal to 0.3 mm.

The base substrate 310 may be disposed on the carrier film 200. The base substrate 310 may be glass. For example, the base substrate 310 may include an ultra-thin glass. The base substrate 310 may be a glass processed using a physical strengthening method or a chemical strengthening method using an ion exchange method. According to an embodiment, the base substrate 310 may include sapphire glass or plastic.

Figure 2A:
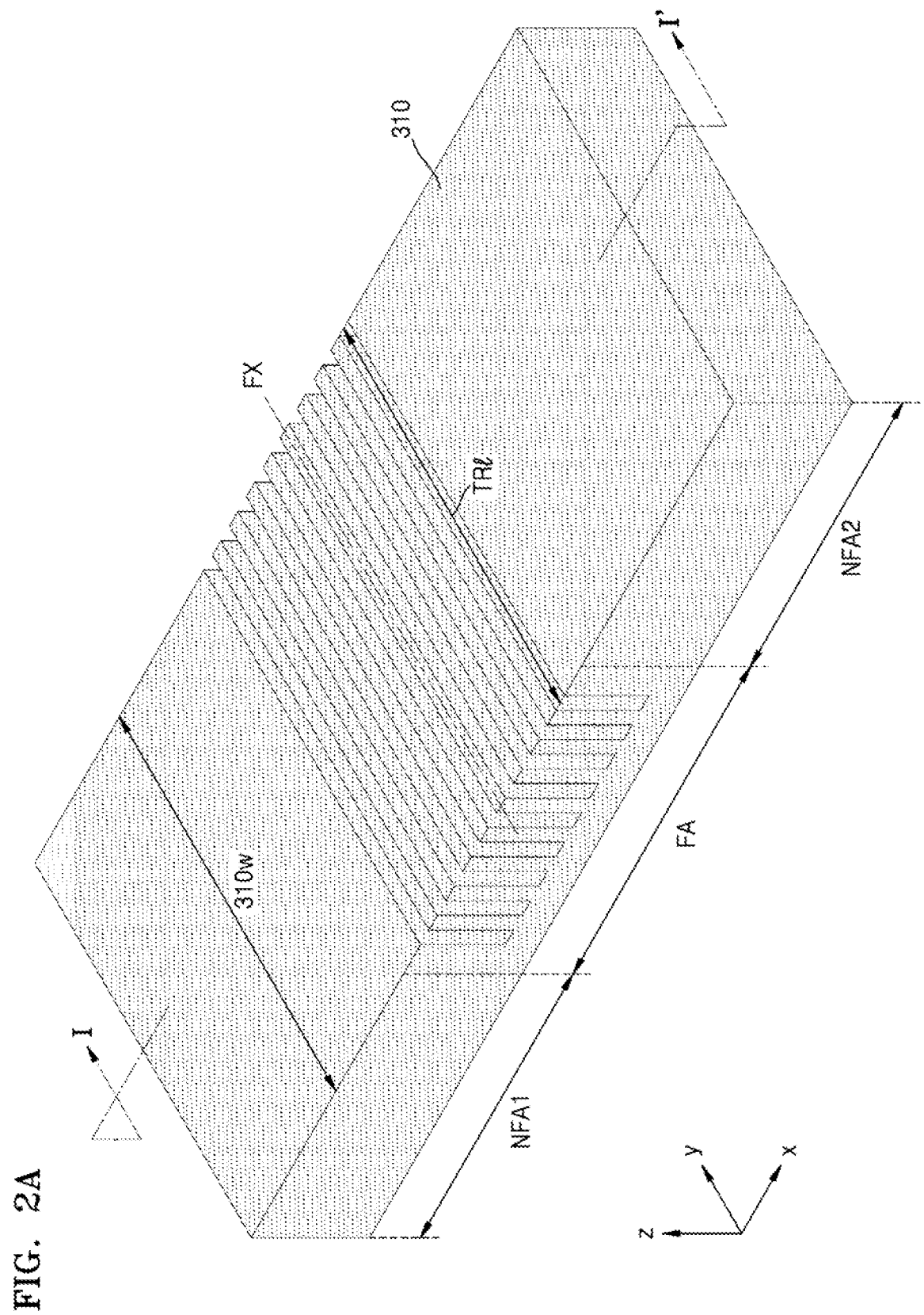
FIG. 2A is a schematic perspective view of a base substrate according to an embodiment of the disclosure.
Figure 3A:
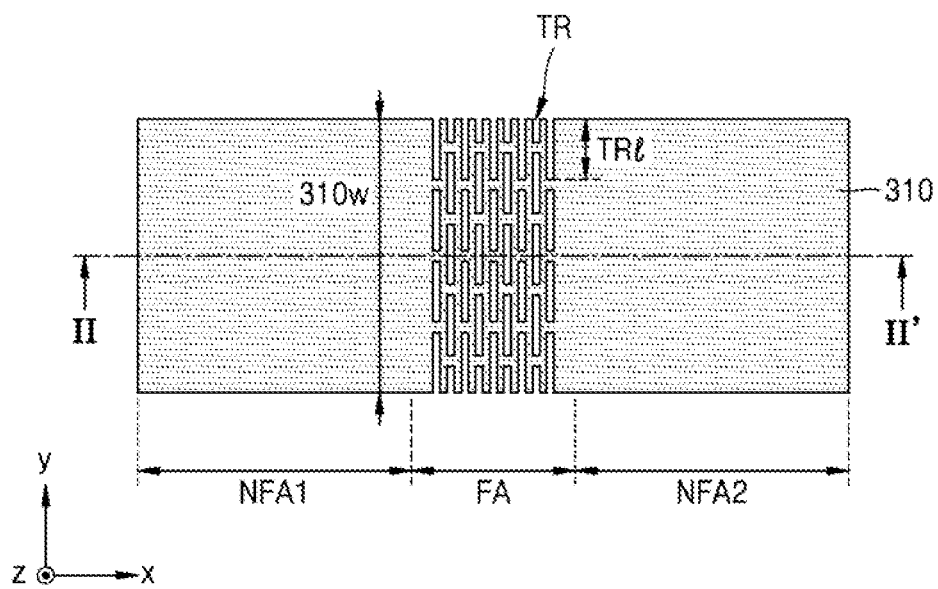
FIG. 3A is a schematic plan view of a base substrate according to an embodiment of the disclosure.

According to an embodiment, as shown in FIGS. 2A and 3A to be described later, the base substrate 310 may have a plurality of trenches TR disposed therein. For example, the plurality of trenches TR may be formed in a first surface 310*a* of the base substrate 310. Each of the plurality of trenches TR may extend in a first direction (for example, a +y direction).

Figure 10:
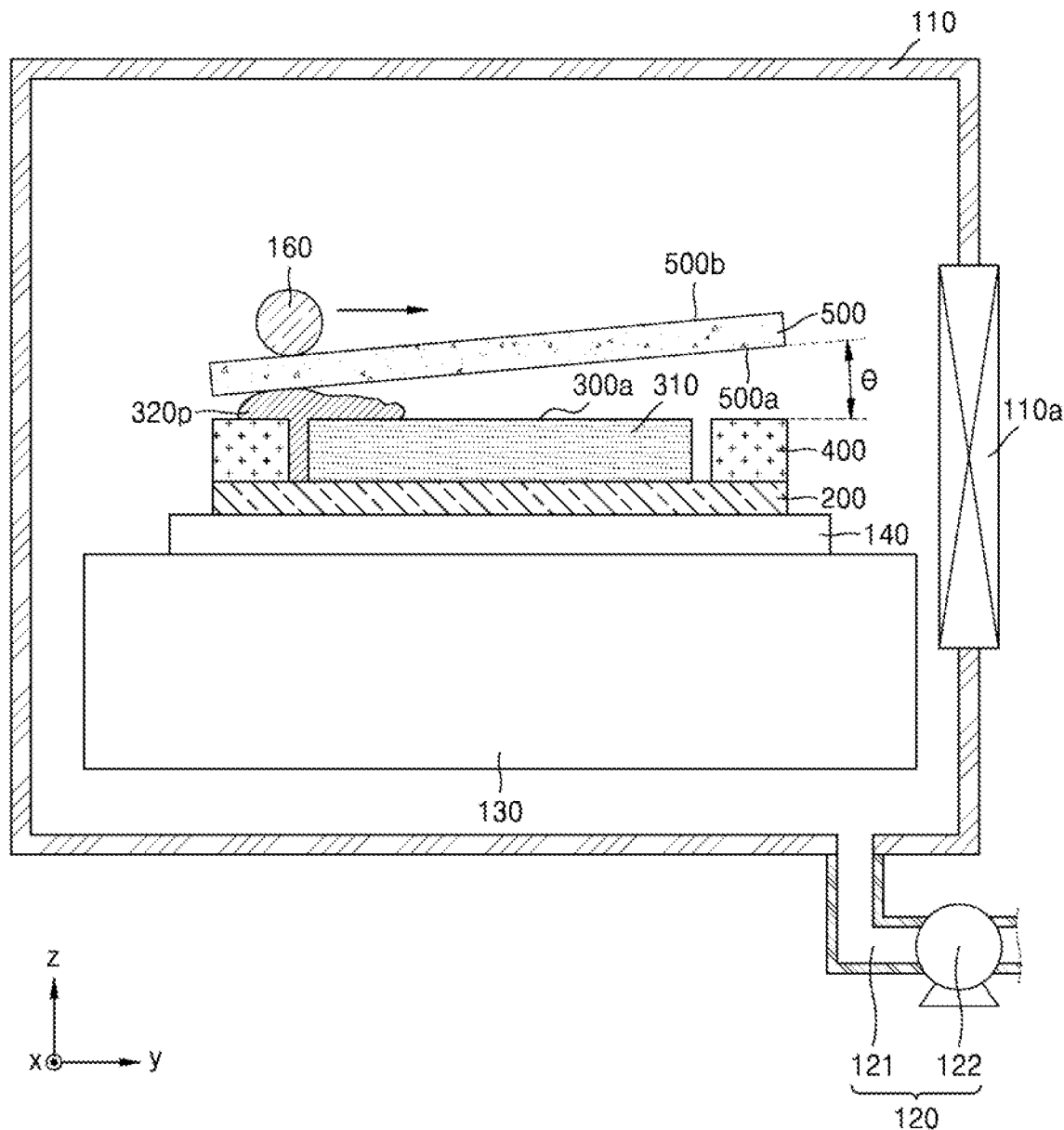
Figure 14:
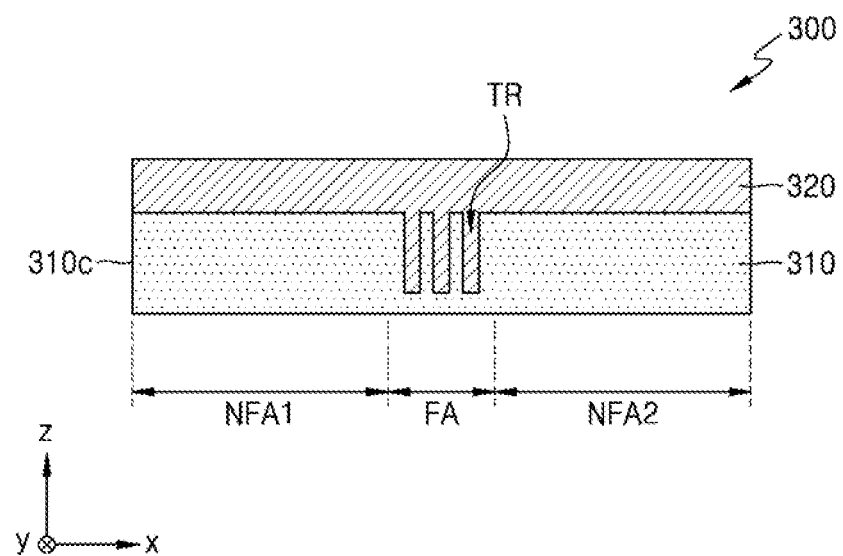
FIG. 14 is a schematic cross-sectional view of a window member according to an embodiment of the disclosure.
Figure 15:
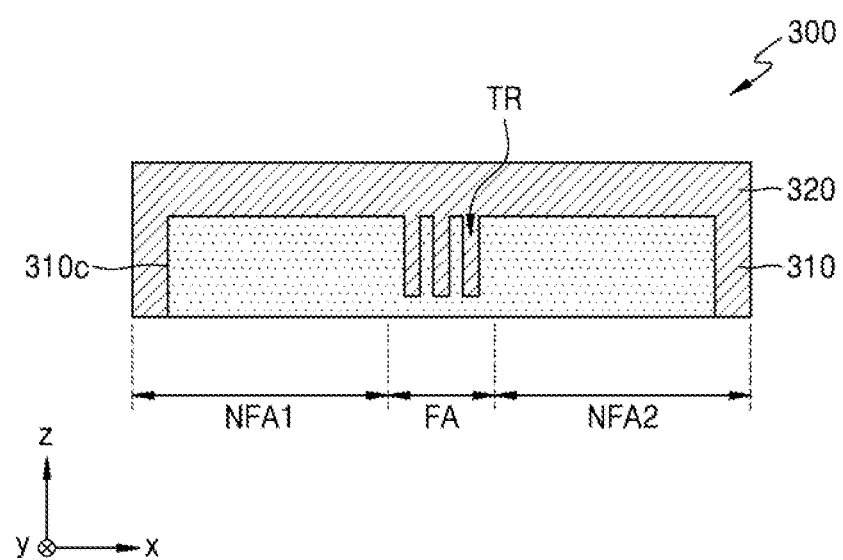
FIG. 15 is a schematic cross-sectional view of a window member according to an embodiment of the disclosure.

As shown in FIG. 10 to be described later, the trenches TR of the base substrate 310 may be filled with a first soft material 320*p* under a vacuum atmosphere, and, as shown in FIGS. 14 and 15 to be described later, window members 300 may be manufactured.

The auxiliary film 400 may be disposed on the carrier film 200. The auxiliary film 400 may include plastic. For example, the auxiliary film 400 may include polyethylene terephthalate (PET), polyimide (PI), polyamide-imide (PAI), polypropylene (PP), polystyrene (PS), or the like. For example, the auxiliary film 400 may include glass. For example, the carrier film 200 may include an ultra-thin glass.

Figure 4:
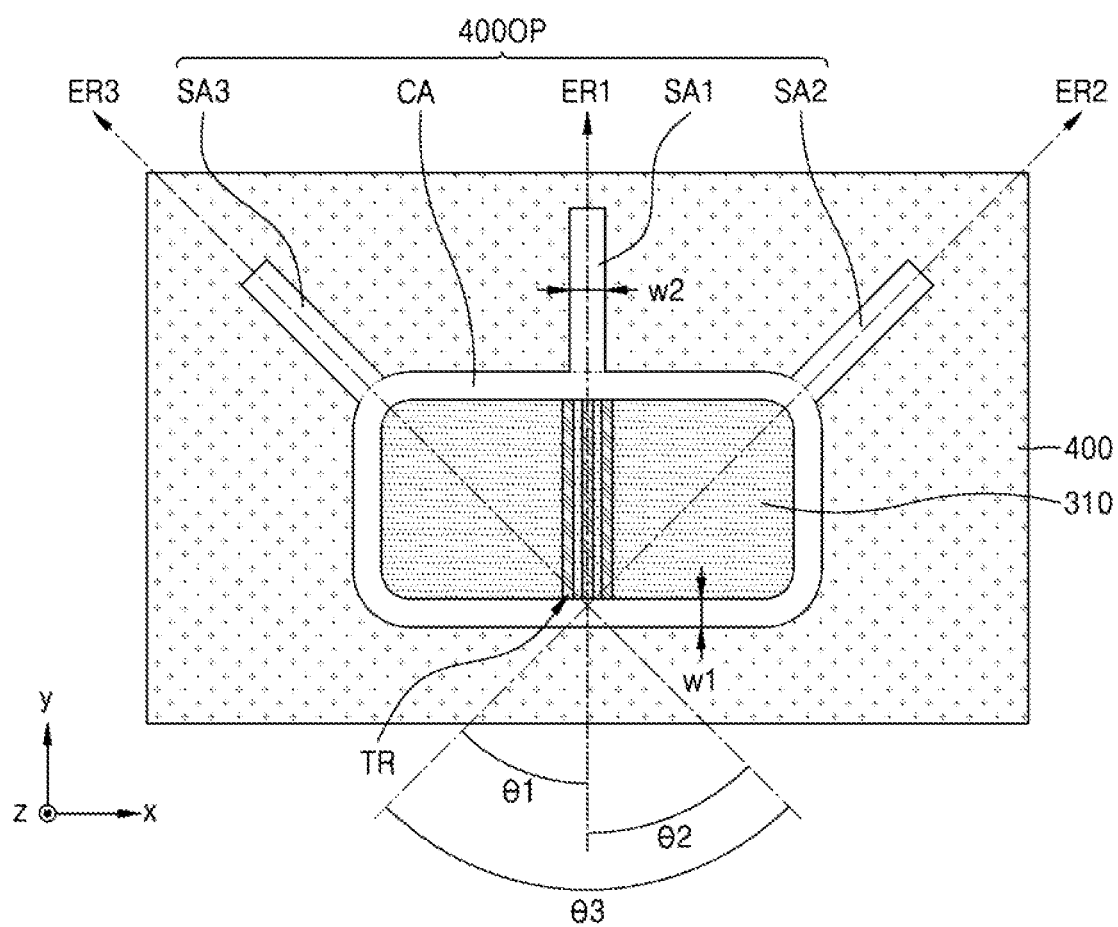
FIG. 4 is a schematic plan view of an auxiliary film and a base substrate, according to an embodiment of the disclosure.
Figure 5:
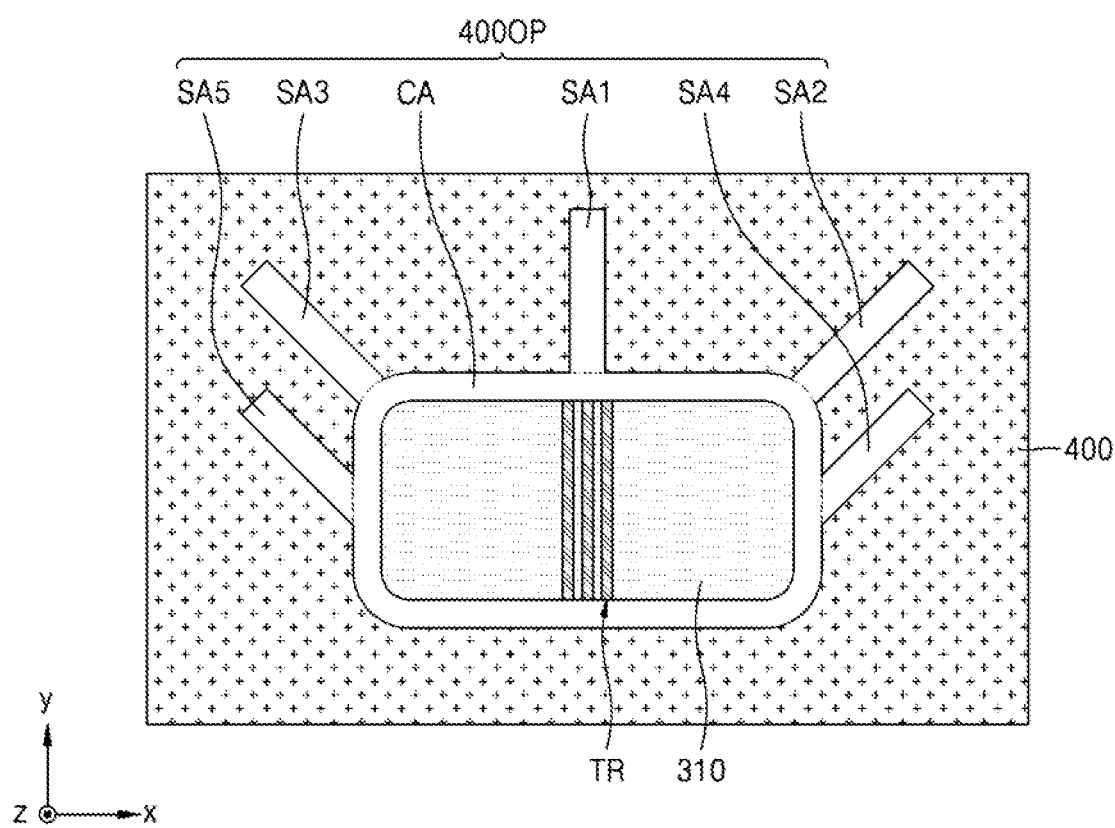
FIG. 5 is a schematic plan view of an auxiliary film and a base substrate, according to an embodiment of the disclosure.
Figure 6:
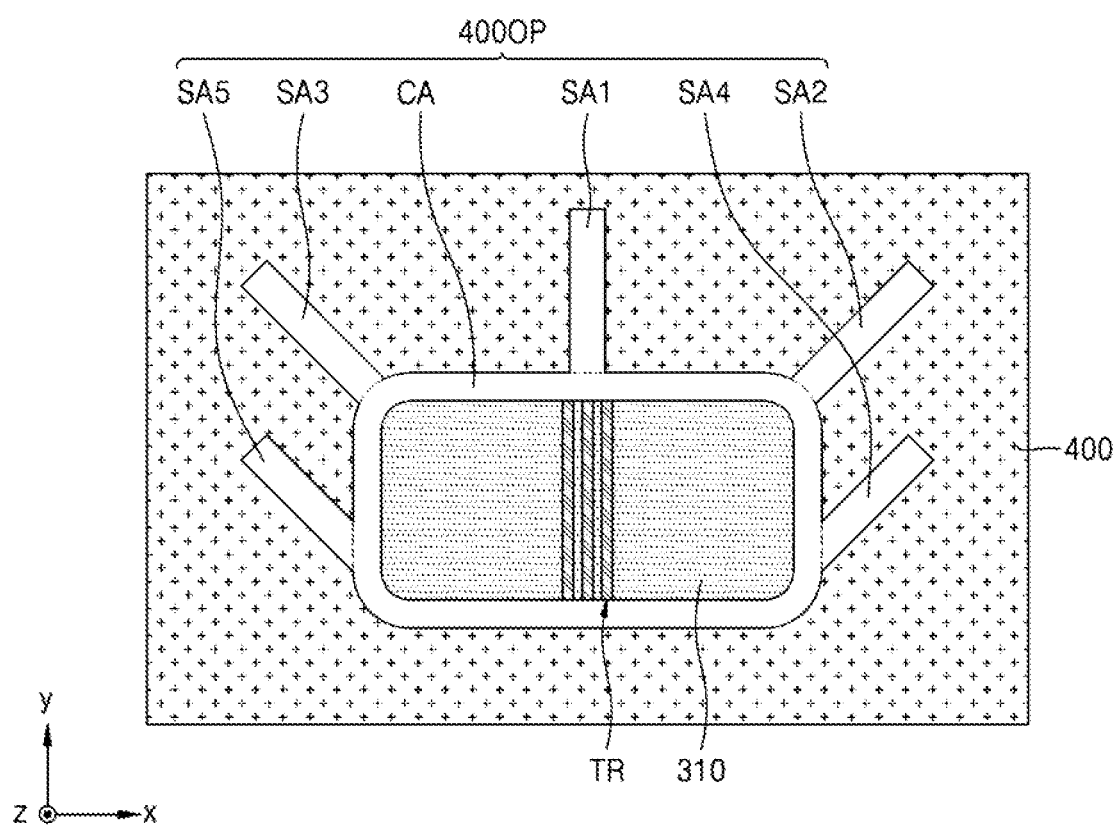
FIG. 6 is a schematic plan view of an auxiliary film and a base substrate, according to an embodiment of the disclosure.

The auxiliary film 400 may surround at least a portion of the base substrate 310. For example, as shown in FIGS. 4 through 6 to be described later, the auxiliary film 400 may have an opening 400OP that surrounds the base substrate 310.

According to an embodiment, an area of the opening 400OP of the auxiliary film 400 may be larger than that of the base substrate 310. In this case, a space may be formed between the auxiliary film 400 and the base substrate 310. As shown in FIG. 10 to be described later, when the trenches TR of the base substrate 310 are filled with the first soft material 320*p*, the first soft material 320*p* may be prevented from flowing out of the carrier film 200.

Figure 7:
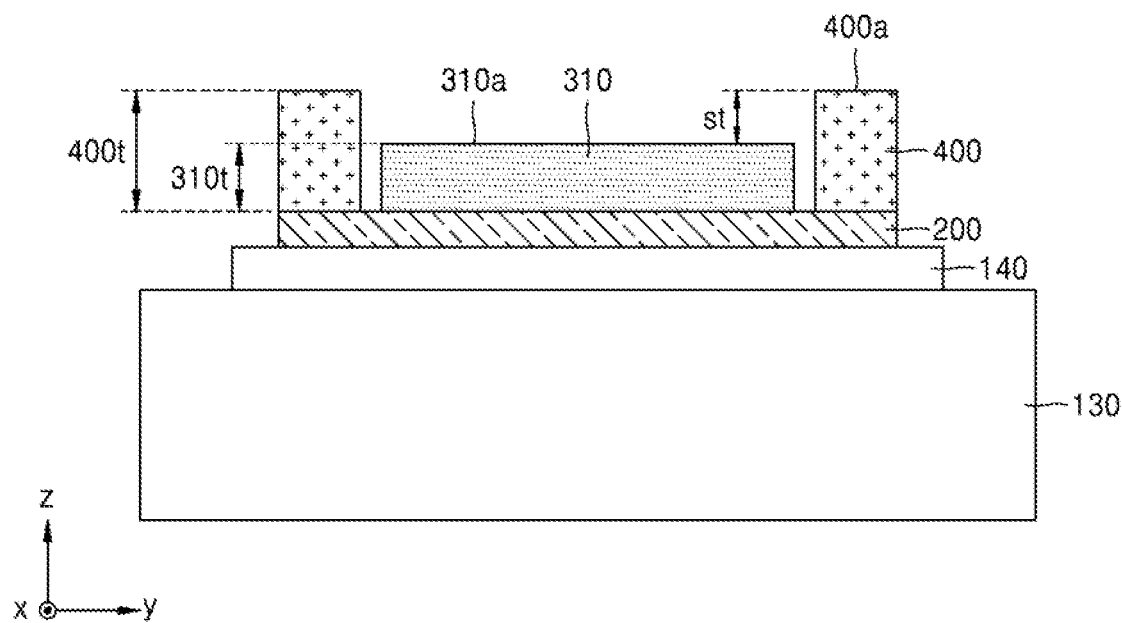
FIG. 7 is a schematic cross-sectional view of an auxiliary film and a base substrate, according to an embodiment of the disclosure.

Although a thickness 310*t* of the base substrate 310 and a thickness 400*t* of the auxiliary film 400 are substantially equal to each other in FIG. 1, the thickness 310*t* of the base substrate 310 and the thickness 400*t* of the auxiliary film 400 may be different from each other. For example, as shown in FIG. 7 to be described later, the thickness 400*t* of the auxiliary film 400 may be greater than the thickness 310*t* of the base substrate 310.

The dispenser 150 may provide a soft material onto the auxiliary film 400 and/or the base substrate 310. The soft material may be a material that is optically transparent and has physically low strength and low hardness. The soft material may be a flexible material. The soft material may be stretched or compressed by an external force. For example, the soft material may be a silicon-based resin, an Optically Clear Resin (OCR), or an Optically Clear Adhesive.

A modulus of the soft material may be less than that of the base substrate 310. The soft material may have substantially the same refractive index as the base substrate 310 for index matching.

In FIG. 1, the dispenser 150 is disposed outside the chamber 110. However, the dispenser 150 may be arrange within the chamber 110. The dispenser 150 may be fixed to the chamber 110 and/or the support 130 via a fixer such as a bracket or fastener.

The pressurizer 160 may be disposed within the chamber 110. When the inside of the chamber 110 is adjusted to be similar to vacuum, the pressurizer 160 may operate under a vacuum atmosphere. The pressurizer 160 may be fixed to the chamber 110 and/or the support 130 via a fixer such as a bracket or fastener.

Figure 16:
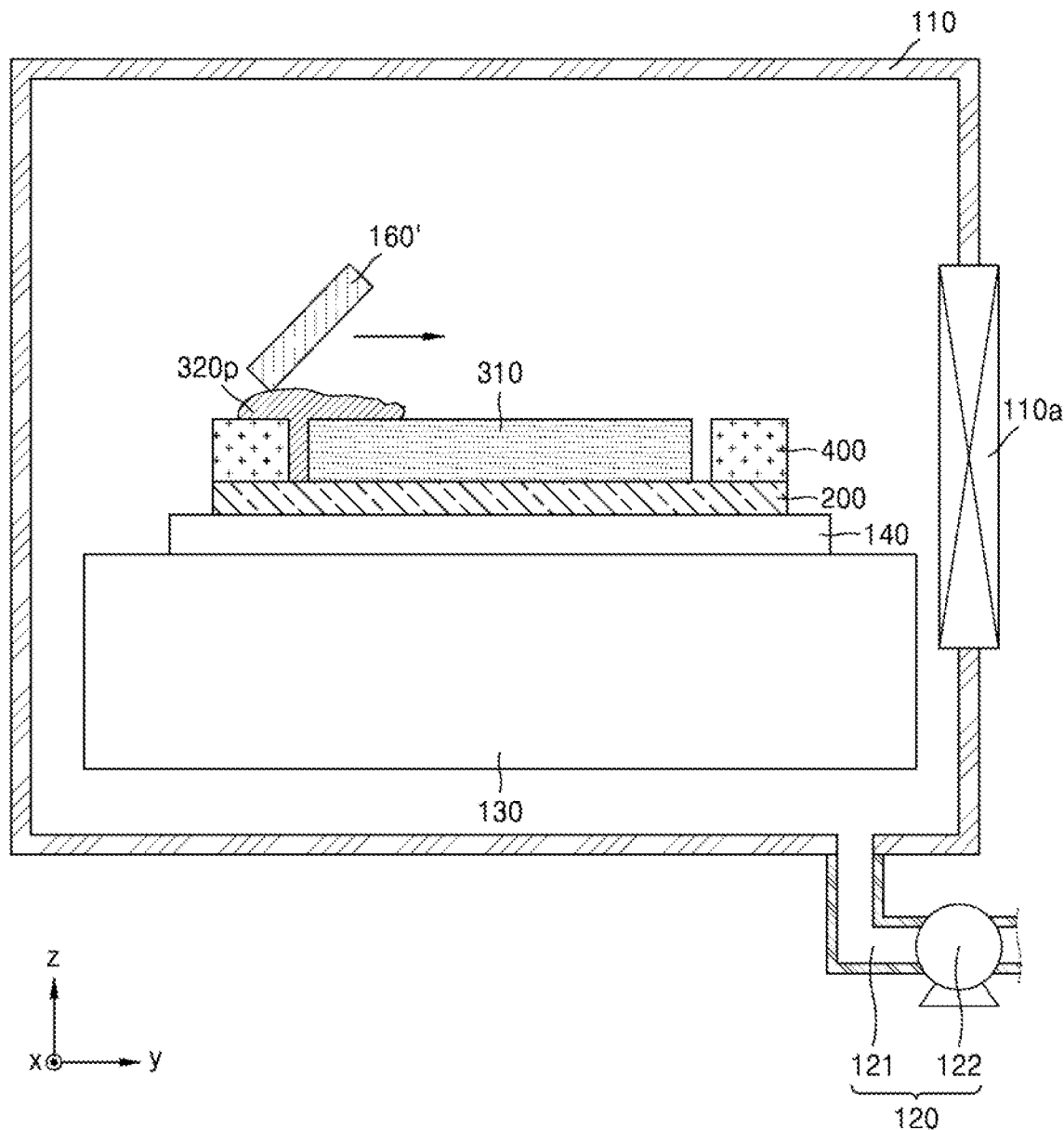
FIG. 16 is a cross-sectional view of a method of manufacturing a window member, according to an embodiment of the disclosure.

The pressurizer 160 may include a roller, a blade, or the like. The pressurizer 160 may apply pressure to a material or object by using the roller, the blade, or the like. For example, as shown in FIGS. 10 and 16 to be described later, the pressurizer 160 may apply pressure to the first soft material 320*p*.

Figure 11:
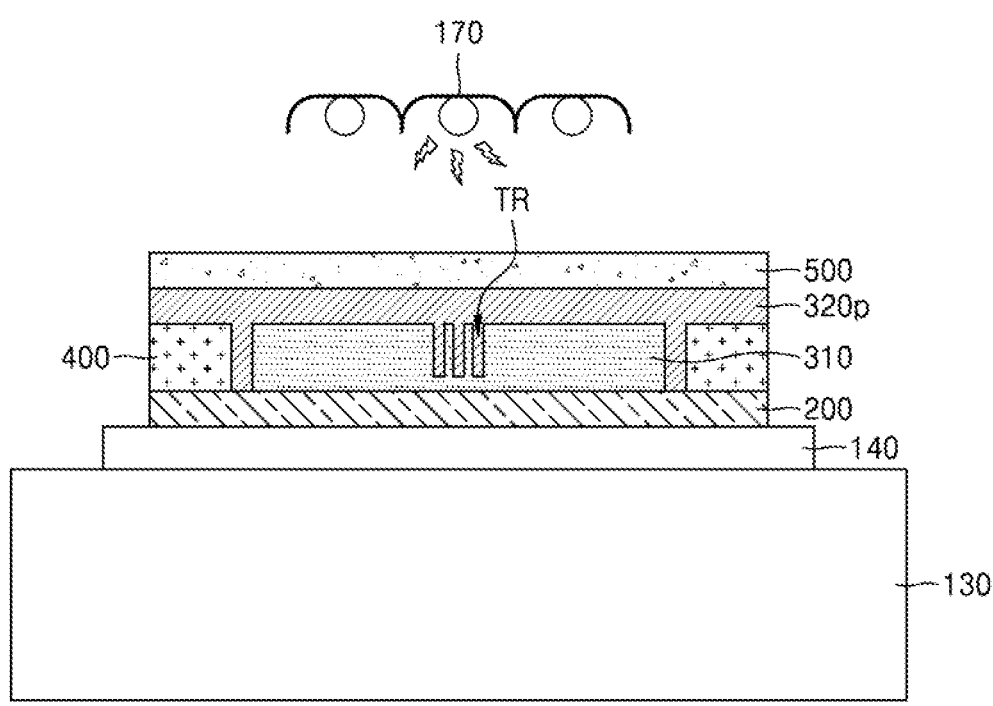

The curing machine 170 may emit light and/or heat. As shown in FIG. 11 to be described later, the curing machine 170 may cure the first soft material 320p. The curing machine 170 may provide light and/or heat to the first soft material 320p and may cure the first soft material 320p thereby.

In FIG. 1, the curing machine 170 is disposed outside of the chamber 110. However, the curing machine 170 may be arrange within the chamber 110. The curing machine 170 may be fixed to the chamber 110 and/or the support 130 via a fixer such as a bracket or fastener.

The cutting machine 180 may include a knife, a blade, a laser cutter, or the like. The cutting machine 180 may cut a material or an object by using the knife, the blade, the laser cutter, or the like. According to an embodiment, the cutting machine 180 may include a laser source. The cutting machine 180 may direct a laser beam to a material or an object and may cut the material or the object thereby.

Figure 2B:
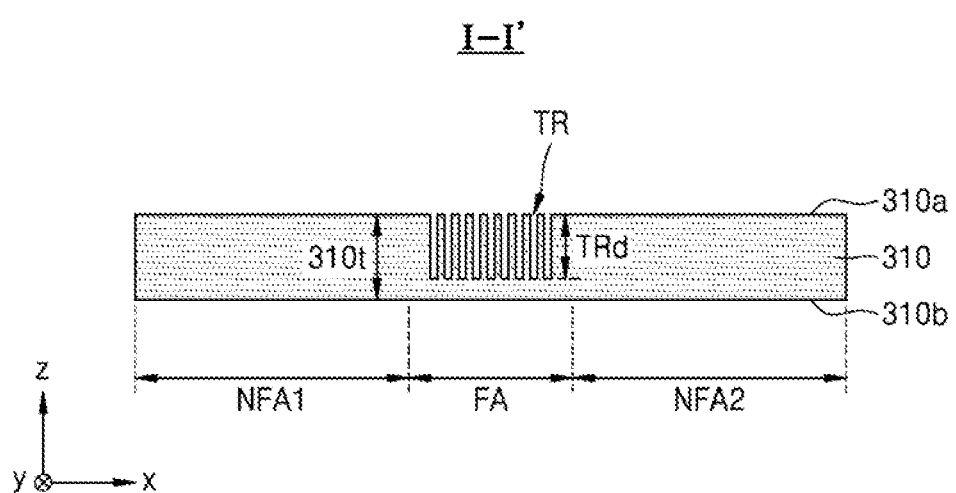
FIG. 2B is a cross-sectional view of the base substrate of FIG. 2A taken along line I-I'.

FIG. 2A is a schematic perspective view of a base substrate according to an embodiment of the disclosure, and FIG. 2B is a cross-sectional view of the base substrate of FIG. 2A taken along line I-I'.

Referring to FIGS. 2A and 2B, the base substrate 310 may be in-folded (e.g., folded inwardly) or out-folded (e.g., folded outwardly) based on a folding axis FX (for example, a y axis). In-folding may refer to the base substrate 310 being folded in a +z direction with respect to the folding axis FX, and out-folding may refer to the base substrate 310 being folded in a −z direction with respect to the folding axis FX. For example, in-folding may refer to the first surface 310a of the base substrate 310 being folded such that portions of the first surface 310a face each other, and out-folding may refer to a second surface 310b of the base substrate 310 being folded such that portions of the second surface 310b face each other.

A plurality of areas may be defined in the base substrate 310 according to operational types. The plurality of areas may include a folding area FA and at least one non-folding area. For example, the plurality of areas may include the folding area FA, a first non-folding area NFA1, and a second non-folding area NFA2. The folding area FA may be disposed between the first non-folding area NFA1 and the second non-folding area NFA2.

The folding area FA may be folded about the folding axis FX. When the base substrate 310 is folded about the folding axis FX, the folding area FA may have a substantially predetermined curvature.

According to an embodiment, the base substrate 310 may have a plurality of trenches TR disposed therein. For example, the plurality of trenches TR may be formed in the first surface 310a of the base substrate 310. The number of trenches TR formed in the base substrate 310 may vary but there may be nine trenches, as shown, fewer than nine trenches, or more than nine trenches.

The plurality of trenches TR may be disposed in the folding area FA of the base substrate 310. When the plurality of trenches TR are formed in the folding area FA of the base substrate 310 as described above, the base substrate 310 may be folded more easily.

Each of the plurality of trenches TR may extend in the first direction (for example, the +y direction). A lengthwise direction of each of the plurality of trenches TR may be the first direction (for example, the +y direction).

According to an embodiment, as shown in FIG. 2A, a length TRC of each of the plurality of trenches TR in the first direction (for example, the +y direction) may be equal to a width 310w of the base substrate 310 in the first direction (for example, the +y direction).

In FIG. 2A, the length TRC of each of the plurality of trenches TR is equal to the width 310w of the base substrate 310. However, the length TRC of each of the plurality of trenches TR may be different from the width 310w of the base substrate 310. This will be described later with reference to FIG. 3A.

According to an embodiment, as shown in FIG. 2B, a depth TRd of each of the plurality of trenches TR in a second direction (for example, a +z direction) may be less than a thickness 310t of the base substrate 310 in the second direction (for example, the +z direction).

In FIG. 2B, the depth TRd of each of the plurality of trenches TR is less than the thickness 310t of the base substrate 310. However, the depth TRd of each of the plurality of trenches TR may be equal to the thickness 310t of the base substrate 310. This will be described later with reference to FIG. 3B.

Figure 3B:
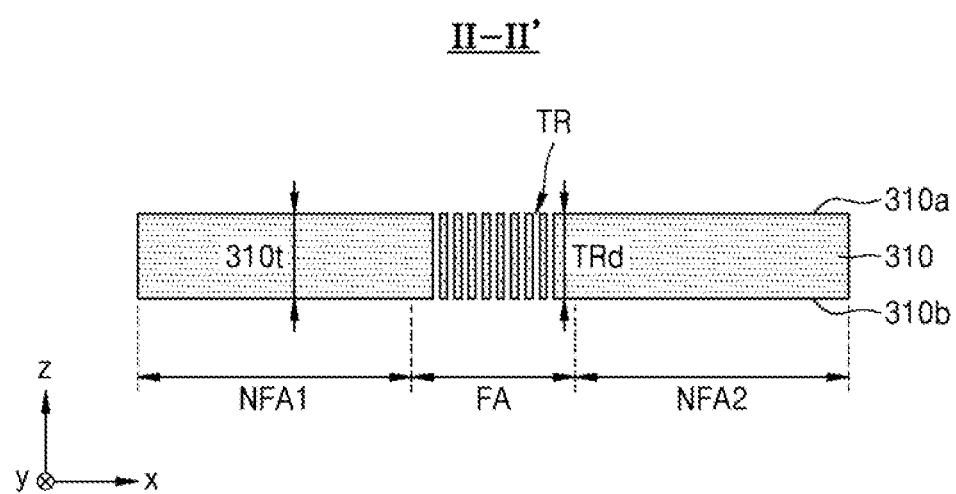
FIG. 3B is a cross-sectional view of the base substrate of FIG. 3A taken along line II-II'.

FIG. 3A is a schematic plan view of a base substrate according to an embodiment of the disclosure, and FIG. 3B is a cross-sectional view of the base substrate of FIG. 3A taken along line II-II'. FIGS. 3A and 3B correspond to a modification of FIGS. 2A and 2B, and thus are different from FIGS. 2A and 2B in the structure of a trench. Hereinafter, differences between the arrangements may be described and to the extent that an element is not described in detail, it may be assumed that the element is at least similar to corresponding elements that are described elsewhere within the instant disclosure.

Referring to FIG. 3A, the plurality of trenches TR may be disposed in the first direction (for example, the +y direction) and a third direction (for example, a +x direction).

In FIG. 3A, trenches TR adjacent to each other in the third direction (for example, the +x direction) are disposed in a zigzag configuration. However, the trenches TR adjacent to each other in the third direction (for example, the +x direction) may be disposed side by side.

According to an embodiment, as shown in FIG. 3A, the length TRC of each of the plurality of trenches TR in the first direction (for example, the +y direction) may be different from the width 310w of the base substrate 310 in the first direction (for example, the +y direction). For example, the length TRC of each of the plurality of trenches TR in the first direction (for example, the +y direction) may be less than the width 310w of the base substrate 310 in the first direction (for example, the +y direction).

According to an embodiment, a sum of the lengths TRC of the plurality of trenches TR in the first direction (for example, the +y direction) may be less than the width 310w of the base substrate 310.

Referring to FIG. 3B, the depth TRd of each of the plurality of trenches TR in the second direction (for example, the +z direction) may be equal to the thickness 310t of the base substrate 310 in the second direction (for example, the +z direction).

According to an embodiment, as shown in FIG. 2B, the depth TRd of each of the plurality of trenches TR in the second direction (for example, the +z direction) may be less than the thickness 310t of the base substrate 310 in the second direction (for example, the +z direction).

FIGS. 4 through 6 are plan views schematically illustrating an auxiliary film and a base substrate according to an embodiment of the disclosure.

Referring to FIG. 4, the auxiliary film 400 may surround at least a portion of the base substrate 310. The auxiliary film 400 may have the opening 400OP that surrounds the base substrate 310. For example, the base substrate 310 may be disposed within the opening 400OP of the auxiliary film 400.

The opening 400OP of the auxiliary film 400 may include a center area CA overlapping the base substrate 310, and at least one auxiliary area extending from the center area CA in one direction. For example, as shown in FIG. 4, the opening 400OP of the auxiliary film 400 may include the center area CA, a first auxiliary area SA1, a second auxiliary area SA2, and a third auxiliary area SA3. As an example, as shown in FIGS. 5 and 6, the opening 400OP of the auxiliary film 400 may further include a fourth auxiliary area SA4 and a fifth auxiliary area SA5. A distance between the second auxiliary area SA2 and the fourth auxiliary area SA4 may be different from a distance between the third auxiliary area SA3 and the fifth auxiliary area SA5. As shown in FIG. 6, the distance between the second auxiliary area SA2 and the fourth auxiliary area SA4 and the distance between the third auxiliary area SA3 and the fifth auxiliary area SA5 may increase. As such, the number of auxiliary films and locations thereof may vary.

According to an embodiment, the area of the opening 400OP of the auxiliary film 400 may be larger than that of the base substrate 310. The area of the opening 400OP of the auxiliary film 400 may be larger than that of the base substrate 310.

For example, a space may be formed between the auxiliary film 400 and the base substrate 310. As shown in FIG. 10 to be described later, the space between the auxiliary film 400 and the base substrate 310 may serve as a flow path through which air bubbles remaining in the chamber 110 or the trenches TR of the base substrate 310 are discharged when the trenches TR are filled with the first soft material 320$p$ under a vacuum atmosphere. The space between the auxiliary film 400 and the base substrate 310 may prevent the first soft material 320$p$ from flowing out of the carrier film 200.

According to an embodiment, a width w1 of the space between the auxiliary film 400 and the base substrate 310 may vary according to a speed at which the pressurizer 160 of FIG. 10, which will be described later, moves.

According to an embodiment, the width w1 of the space between the auxiliary film 400 and the base substrate 310 may vary according to a degree of vacuum inside of the chamber 110.

According to an embodiment, the width w1 of the space between the auxiliary film 400 and the base substrate 310 may be about 1 mm to about 5 mm.

As a comparative example, when a width of a space between the auxiliary film and the base substrate is less than 1 mm, a width of the flow path may be less than the size of air bubbles, and thus the air bubbles may not be discharged. When the width of the space between the auxiliary film and the base substrate exceeds 5 mm, the width of the flow path may be somewhat increased, and thus the air bubbles might not be discharged. In this case, when the trenches of the base substrate are filled with the soft material, the trenches of the base substrate may also be filled with air bubbles that cannot escape. When the trenches of the base substrate are also filled with air bubbles, even when a refractive index of the soft material is substantially equal to that of the base substrate, the trenches may be visually recognized by the air bubbles.

Although the planar shape of the center area CA and the planar shape of the base substrate 310 are rounded rectangles in FIGS. 4 through 6, the planar shape of the center area CA and the planar shape of the base substrate 310 may vary. For example, the planar shape of the center area CA and the planar shape of the base substrate 310 may be polygons (such as rectangles or rectangles), circles, ovals, or the like.

According to an embodiment, an auxiliary area of the opening 400OP may extend from the center area CA in one direction. The one direction may be similar to the first direction (for example, the +y direction), which is a direction in which the pressurizer 160 of FIG. 10 to be described later moves. The one direction being similar to the first direction (for example, the +y direction) may refer to an angle between the one direction and the first direction (for example, the +y direction) being equal to or greater than 0° and less than 90°.

For example, as shown in FIG. 4, the first auxiliary area SA1 may extend from the center area CA in a first extension direction ER1, the second auxiliary area SA2 may extend from the center area CA in a second extension direction ER2, and the third auxiliary area SA3 may extend from the center area CA in a third extension direction ER3. In this case, an angle between the first extension direction ER1 and the first direction (for example, the +y direction) may be 0°, an angle θ1 between the second extension direction ER2 and the first direction (for example, the +y direction) may be greater than 0° and less than 90°, and an angle θ2 between the third extension direction ER3 and the first direction (for example, the +y direction) may be greater than 0° and less than 90°.

In this case, a flow path may be formed in a direction in which the first soft material 320$p$ is moved by the pressurizer 160. At this time, air bubbles remaining the chamber 110 or the trenches TR might not be isolated in the space between the auxiliary film 400 and the base substrate 310 and may be discharged to the first auxiliary area SA1, the second auxiliary area SA2, and the third auxiliary area SA3.

As shown in FIG. 4, the first auxiliary area SA1, the second auxiliary area SA2, and the third auxiliary area SA3 may extend radially. For example, the first extension direction ER1 and the second extension direction ER2 may intersect each other, the second extension direction ER2 and the third extension direction ER3 may intersect each other, and the third extension direction ER3 and the first extension direction ER1 may intersect each other. The angle θ1 between the first extension direction ER1 and the second extension direction ER2 may be greater than 0° and less than 90°, the angle θ2 between the first extension direction ER1 and the third extension direction ER3 may be greater than 0° and less than 90°, and an angle θ3 between the second extension direction ER2) and the third extension direction ER3 may be greater than 0° and less than 90°.

In this case, the flow path may be implemented in a radial shape, and air bubbles remaining in the chamber 110 or the trenches TR may be effectively discharged.

According to an embodiment, a width w2 of the auxiliary area may be about 1 mm to about 5 mm.

As a comparative example, when a width of the auxiliary area is less than 1 mm, a width of the flow path may be less than the size of air bubbles, and thus the air bubbles might not be discharged. When the width of the auxiliary area exceeds 5 mm, the width of the flow path may be somewhat increased, and thus the air bubbles might not be discharged. In this case, when the trenches of the base substrate are filled with the soft material, the trenches of the base substrate may also be filled with air bubbles that cannot escape. When the trenches of the base substrate are also filled with air bubbles, even when a refractive index of the soft material is substantially equal to that of the base substrate, the trenches may be visually recognized by the air bubbles.

The first auxiliary area SA1, the second auxiliary area SA2, and the third auxiliary area SA3 of FIG. 4 have been focused on and described above, but the description thereof is equally applicable to a fourth auxiliary area SA4 and a fifth auxiliary area SA5 of FIGS. 5 and 6.

FIG. 7 is a schematic cross-sectional view of an auxiliary film and a base substrate according to an embodiment of the disclosure. FIG. 7 is a modification of FIG. 1, and is thus different therefrom in the structure of the auxiliary film. Hereinafter, differences between the arrangements may be described and to the extent that an element is not described in detail, it may be assumed that the element is at least similar to corresponding elements that are described elsewhere within the instant disclosure.

Referring to FIG. 7, the thickness 400t of the auxiliary film 400 may be greater than the thickness 310t of the base substrate 310. A step st may be formed between the first surface 400a of the auxiliary film 400 and the first surface 310a of the base substrate 310.

As shown in FIG. 11 to be described later, a first protective layer 320 may be formed by curing the first soft material 320p filled within the trenches TR of the base substrate 310. The first protective layer 320 may cover the first surface 400a of the auxiliary film 400 and the first surface 310a of the base substrate 310.

When the auxiliary film 400 of FIG. 7 is used, a thickness of the first protective layer 320 disposed on the first surface 310a of the base substrate 310 may increase by the step st between the first surface 400a of the auxiliary film 400 and the first surface 310a of the base substrate 310.

As such, the auxiliary film 400 having a larger thickness than the thickness 310t of the base substrate 310 may surround the base substrate 310, thereby adjusting the thickness of the first protective layer 320 disposed on the first surface 310a of the base substrate 310.

FIGS. 8 through 13 are cross-sectional views illustrating a method of manufacturing a window member, according to an embodiment of the disclosure.

Figure 8:
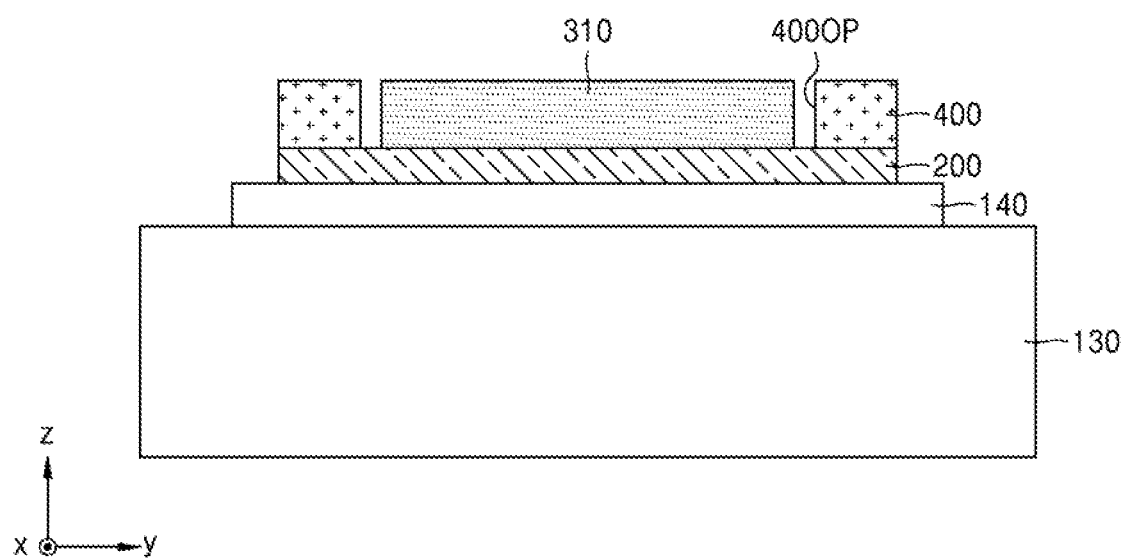
FIGS. 8 through 13 are cross-sectional views illustrating a method of manufacturing a window member, according to an embodiment of the disclosure.

First, referring to FIG. 8, the carrier film 200 may be disposed on the moving unit 140 disposed on the support 130, and the base substrate 310 and the auxiliary film 400 may be disposed on the carrier film 200.

Any order of arrangement of the base substrate 310 and the auxiliary film 400 may be used. For example, the base substrate 310 may be first arranged and then the auxiliary film 400 may be arranged, or the auxiliary film 400 may be first arranged and then the base substrate 310 may be arranged, or the base substrate 310 and the auxiliary film 400 may be arranged simultaneously.

In FIG. 8, the auxiliary film 400 is disposed on the carrier film 200. However, the auxiliary film 400 may be omitted.

FIG. 8 illustrates a cross-section of the base substrate 310 taken along an yz plane in order to describe a movement direction of the pressurizer 160 of FIG. 10. The base substrate 310 may have a plurality of trenches TR of which a lengthwise direction is the first direction (for example, the +y direction) as described above with reference to FIGS. 2A and 3A. The auxiliary film 400 may surround at least a portion of the base substrate 310, and, as described above with reference to FIGS. 4 through 6, may have the opening 400OP surrounding the base substrate 310.

Figure 9A:
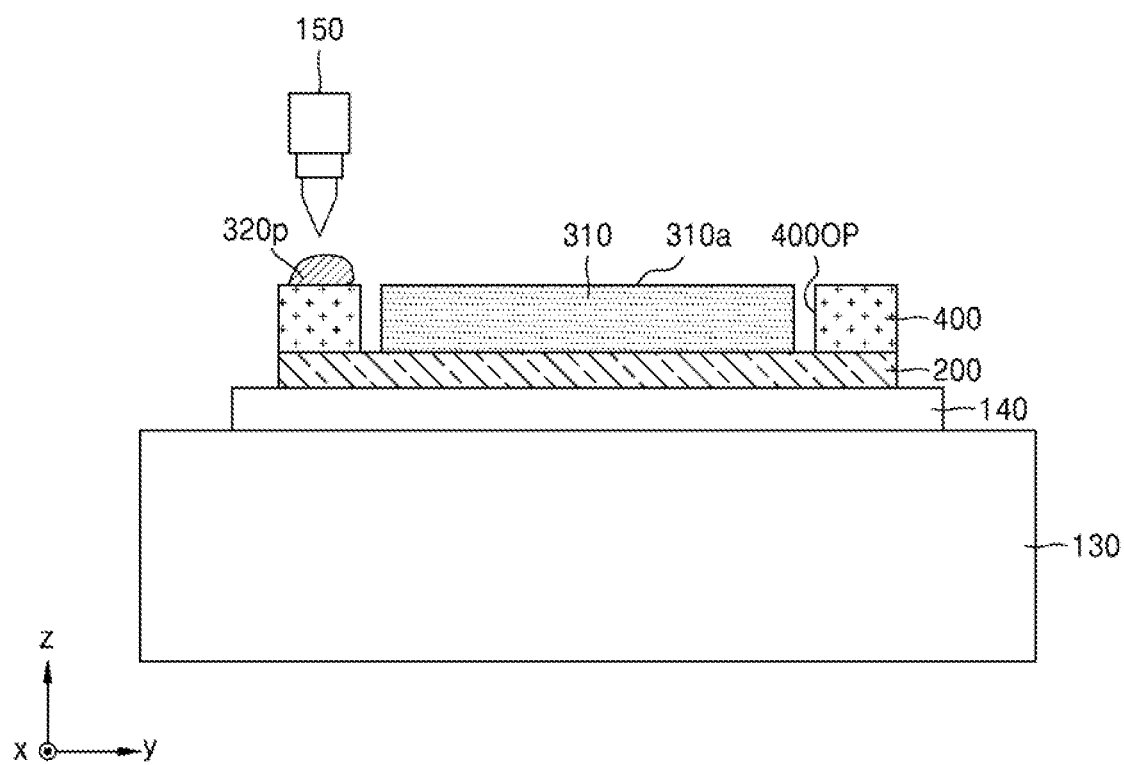

Next, referring to FIG. 9A, the first soft material 320p may be provided on one side of the base substrate 310. The first soft material 320p may be provided on one side of the base substrate 310 by using the dispenser 150 described above with reference to FIG. 1.

The first soft material 320p may be a material that is optically transparent and has physically low strength and low hardness. The first soft material 320p may be a flexible material. The first soft material 320p may be stretched or compressed by an external force. For example, the first soft material 320p may be a silicon-based resin, an Optically Clear Resin (OCR), or an Optically Clear Adhesive.

A modulus of the first soft material 320p may be less than that of the base substrate 310. The first soft material 320p may have substantially the same refractive index as the base substrate 310.

Figure 9B:
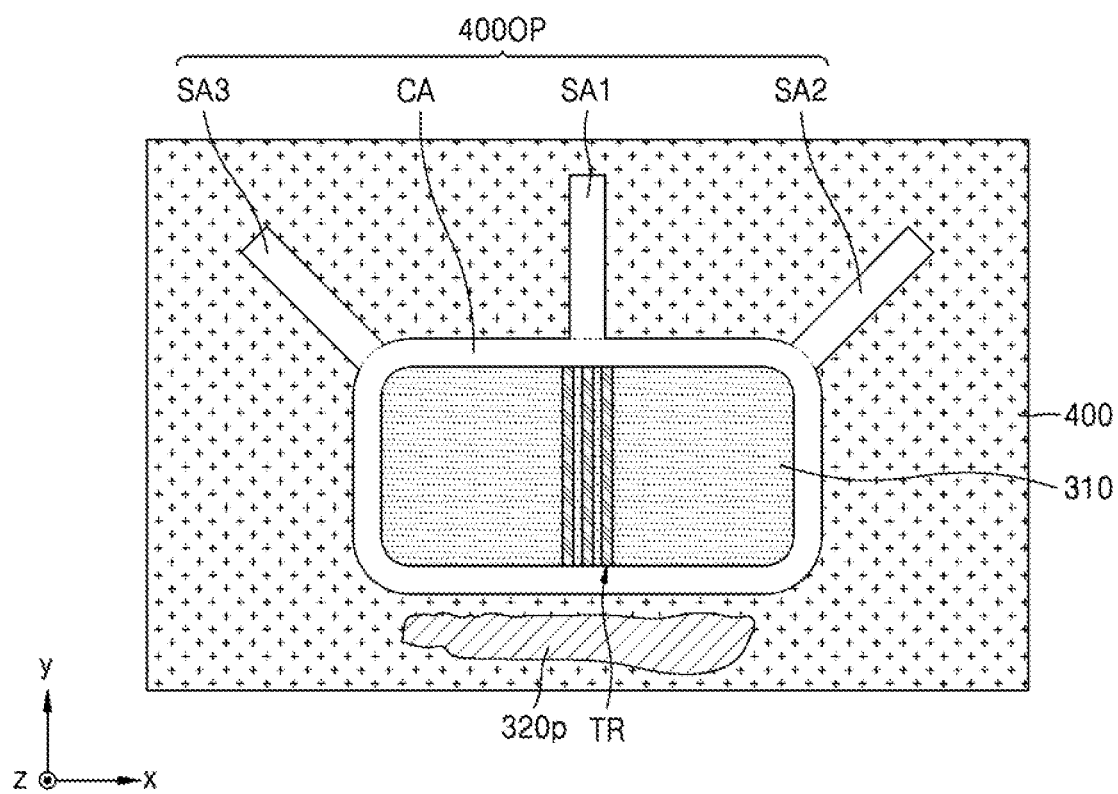

According to an embodiment, as shown in FIGS. 9A and 9B, the first soft material 320p may be provided on the auxiliary film 400 disposed on one side of the base substrate 310. The first soft material 320p may be provided in a direction intersecting the lengthwise direction of the trenches TR. For example, the first soft material 320p may be provided in the third direction (for example, the +x direction) perpendicular to the first direction (for example, the +y direction).

The first soft material 320p may be spaced apart from the first, second, and third auxiliary areas SA1, SA2, SA3 of the opening 400OP of the auxiliary film 400 with the base substrate 310 or the center area CA of the opening 400OP of the auxiliary film 400.

In FIGS. 9A and 9B, the first soft material 320p is provided on the auxiliary film 400 disposed on one side of the base substrate 310. However, the first soft material 320p may be provided on one side of the first surface 310a of the base substrate 310, or the first soft material 320p may be provided on one side of the auxiliary film 400 and the first surface 310a of the base substrate 310.

Next, referring to FIG. 10, the trenches TR of the base substrate 310 may be filled with the first soft material 320p by pressing the first soft material 320p under a vacuum atmosphere. The vacuum atmosphere may be formed by adjusting internal pressure of the chamber 110 to be similar to a vacuum by using the pressure adjuster 120 connected to the chamber 110. For example, the chamber 110 may be evacuated using the pressure adjuster 120, which may include a vacuum pump.

When the trenches TR of the base substrate 310 are filled with the first soft material 320p, the number of air bubbles remaining in the trenches TR is small and the air bubbles are pushed out of the trenches TR by the first soft material 320p, and thus the trenches TR may be completely (or fully) filled with the first soft material 320p. In this case, because the first soft material 320p may have substantially the same refractive index as the base substrate 310, the trenches TR may not be visually recognized.

According to an embodiment, the first soft material 320p may be pressed by using the pressurizer 160 and an auxiliary substrate 500.

For example, as shown in FIG. 10, the auxiliary substrate 500 may be disposed between the base substrate 310 and the pressurizer 160. One side of a first surface 500a of the auxiliary substrate 500 that faces the first surface 310a of the base substrate 310 may be made to contact the first soft material 320p. Next, the pressurizer 160 may be made to contact a second surface 500b of the auxiliary substrate 500 that faces the first surface 500a of the auxiliary substrate 500. The first soft material 320p may be pressed by moving the pressurizer 160 from the one side of the first surface 500a of the auxiliary substrate 500 to the other side of the first surface 500a of the auxiliary substrate 500. At this time, a direction in which the pressurizer 160 moves may be the same as the first direction (for example, the +y direction) that is the lengthwise direction of the trenches TR of the base substrate 310. The first direction (for example, the +y direction) may be parallel to the first surface 310a of the base substrate 310.

While the pressurizer 160 is moving from the one side of the first surface 500a of the auxiliary substrate 500 to the other side of the first surface 500a of the auxiliary substrate 500, namely, while the pressurizer 160 is moving in the first direction (for example, the +y direction), the angle θ between the first surface 500a of the auxiliary substrate 500 and the first surface 310a of the base substrate 310 may vary. For example, while the pressurizer 160 is moving in the first direction (for example, the +y direction), the angle θ between the first surface 500a of the auxiliary substrate 500 and the first surface 310a of the base substrate 310 may gradually decrease.

Therefore, as shown in FIG. 11 to be described later, the angle θ between the first surface 500a of the auxiliary substrate 500 and the first surface 310a of the base substrate 310 may be 0°, and the surface of the first soft material 320p may be formed flat.

In FIG. 10, because the lengthwise direction of the trenches TR is the first direction (for example, the +y direction), the pressurizer 160 moves in the first direction (for example, the +y direction). However, the direction in which the pressurizer 160 moves may vary according to the lengthwise direction of the trenches TR. For example, when the lengthwise direction of the trenches TR is the third direction (for example, the +x direction), the pressurizer 160 may move in the third direction (for example, the +x direction).

In FIG. 10, the first soft material 320p is pressed by using the pressurizer 160 and the auxiliary substrate 500. However, the auxiliary substrate 500 may be omitted. This will be described later with reference to FIG. 16.

Figure 12:
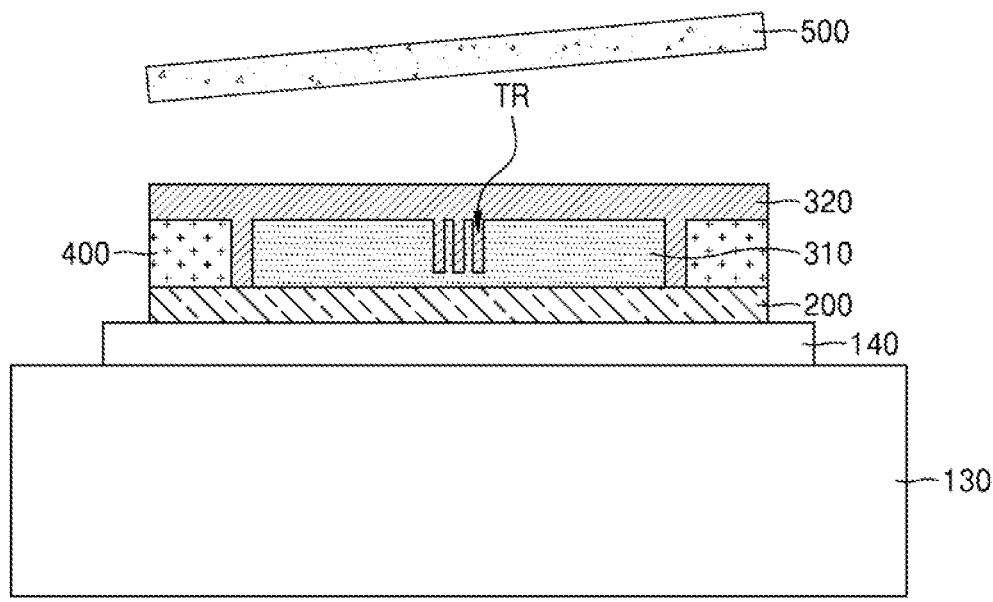

Next, referring to FIGS. 11 and 12, the first protective layer 320 may be formed on the base substrate 310 by curing the first soft material 320p. Thereafter, the auxiliary substrate 500 may be removed. For reference, FIGS. 11 and 12 illustrate cross-sections of the base substrate 310 taken along an xz plane in order to show the trenches TR of the base substrate 310 filled with the first soft material 320p.

The curing machine 170 may generate the first protective layer 320 by curing the first soft material 320p. The first soft material 320p may be exposed to ultraviolet light or heated by the curing machine 170.

Because at least a portion of the first soft material 320p fills the trenches TR of the base substrate 310 through the above-described process of FIG. 10, at least a portion of the first protective layer 320 may be buried in the trenches TR of the base substrate 310.

The first protective layer 320 may be a material that is optically transparent and has physically low strength and has low hardness. The first protective layer 320 may be a flexible material. The first protective layer 320 may be stretched or compressed by an external force. For example, the first protective layer 320 may be a silicon-based resin, an Optically Clear Resin (OCR), or an Optically Clear Adhesive.

A modulus of the first protective layer 320 may be less than that of the base substrate 310. The first protective layer 320 may have substantially the same refractive index as the base substrate 310.

Figure 13:
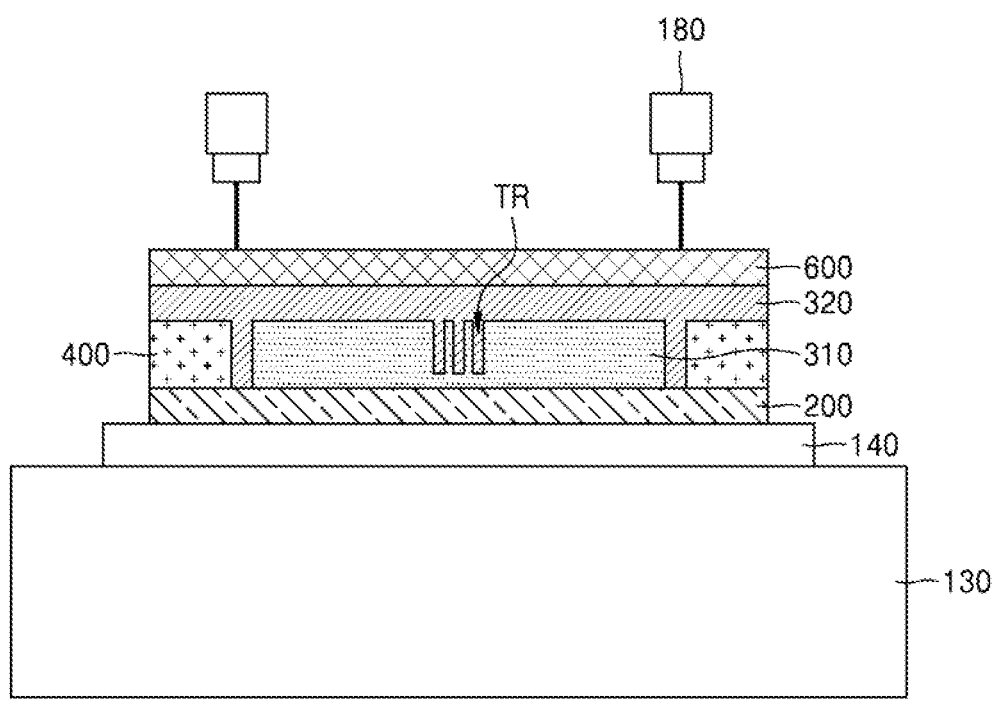

Next, referring to FIG. 13, at least a portion of the first protective layer 320 may be cut. When at least a portion of the first protective layer 320 is cut, a protection film 600 may be attached onto the first protective layer 320 as shown in FIG. 13, and the protection film 600 may also be cut.

The base substrate 310 and the auxiliary film 400 connected to each other by the first protective layer 320 may be separated from each other by cutting at least a portion of the first protective layer 320. The separated base substrate 310 and the at least a portion of the first protective layer 320 may constitute a window member.

In a method of cutting the at least a portion of the first protective layer 320, the at least a portion of the first protective layer 320 may be directly cut through a knife or the like included in the cutting machine 180, or may be cut by a laser to the at least a portion of the first protective layer 320.

According to a location at which the at least a portion of the first protective layer 320 is cut, a window member in which a third surface 310c of the base substrate 310 is exposed may be manufactured as shown in FIG. 14, or a window member in which the third surface 310c of the base substrate 310 is surrounded by the first protective layer 320 may be manufactured as shown in FIG. 15.

FIGS. 14 and 15 are schematic cross-sectional views of window members according to an embodiment of the disclosure.

Because FIGS. 14 and 15 illustrate the window members 300 based on the base substrate 310 of FIG. 2A, a depth of each of the trenches TR of the base substrate 310 is less than the thickness of the base substrate 310. However, according to another embodiment, the depth of each of the trenches TR of the base substrate 310 may be equal to the thickness of the base substrate 310. Because FIGS. 14 and 15 schematically illustrate the base substrate 310 of FIG. 2A, the number of trenches TR of the base substrate 310 may vary.

Referring to FIGS. 14 and 15, each of the window members 300 may include the base substrate 310 and the first protective layer 320. As described above with reference to FIG. 2A, the folding area FA, the first non-folding area NFA1, and the second non-folding area NFA2 may be defined in the base substrate 310, and thus the folding area FA, the first non-folding area NFA1, and the second non-folding area NFA2 may be defined in the window members 300.

The at least a portion of the first protective layer 320 may be buried in each of the trenches TR of the base substrate 310. Because the first protective layer 320 includes the first soft material 320p, the window members 300 may be folded more easily.

The first protective layer 320 may have substantially the same refractive index as the base substrate 310 for index matching. As such, the first protective layer 320 of which a refractive index is substantially the same as the base substrate 310 is buried in the trenches TR of the base substrate 310, and thus a boundary between the trenches TR might not be visually recognized. When index matching between the first protective layer 320 and the base substrate 310 is achieved, the window member 300 may have increased permeability and increased clarity.

According to an embodiment, according to a location at which the at least a portion of the first protective layer 320 is cut in the above-described manufacturing operation of FIG. 13, the third surface 310c of the base substrate 310 may be exposed as shown in FIG. 14, or the third surface 310c of the base substrate 310 may be surrounded by the first protective layer 320 as shown in FIG. 15.

When the third surface 310c of the base substrate 310 is surrounded by the first protective layer 320, impact resistance of the third surface 310c of the base substrate 310 may be reinforced by the first protective layer 320.

In FIGS. 14 and 15, the carrier film 200 of FIG. 13 and the protection film 600 of FIG. 13 are omitted. However, according to another embodiment, the carrier film 200 and the protection film 600 are not omitted, and may be disposed below the base substrate 310 and over the first protective layer 320, respectively.

FIG. 16 is a cross-sectional view of a method of manufacturing a window member, according to an embodiment of the disclosure. FIG. 16 is a modification of FIG. 10, and is thus different therefrom in the structure of an auxiliary substrate. Hereinafter, differences between the arrangements may be described and to the extent that an element is not described in detail, it may be assumed that the element is at least similar to corresponding elements that are described elsewhere within the instant disclosure.

Referring to FIG. 16, when the first soft material 320p is pressed under vacuum atmosphere, only a pressurizer 160' may be used. The pressurizer 160' may be made to directly contact the first soft material 320p, and may be moved in the first direction (for example, the +y direction) to press the first soft material 320p.

FIG. 16 illustrates the pressurizer 160' having a stick shape such as a blade. However, the pressurizer 160' may be a roller. In FIG. 16, the pressurizer 160' is inclined in the first direction (for example, the +y direction) with respect to a z axis. However, the pressurizer 160' may be inclined in a direction opposite to the first direction (for example, the +y direction) with respect to the z axis, or might not be inclined.

In FIG. 16, the pressurizer 160' is moved in the first direction (for example, the +y direction) to press the first soft material 320p. However, the base substrate 310 may be moved in a fourth direction (for example, a −y direction) opposite to the first direction (for example, the +y direction) by the moving unit 140 and may press the first soft material 320p. For example, the pressurizer 160' may be moved relative to the base substrate 310, in the first direction (for example, the +y direction).

Figure 17:
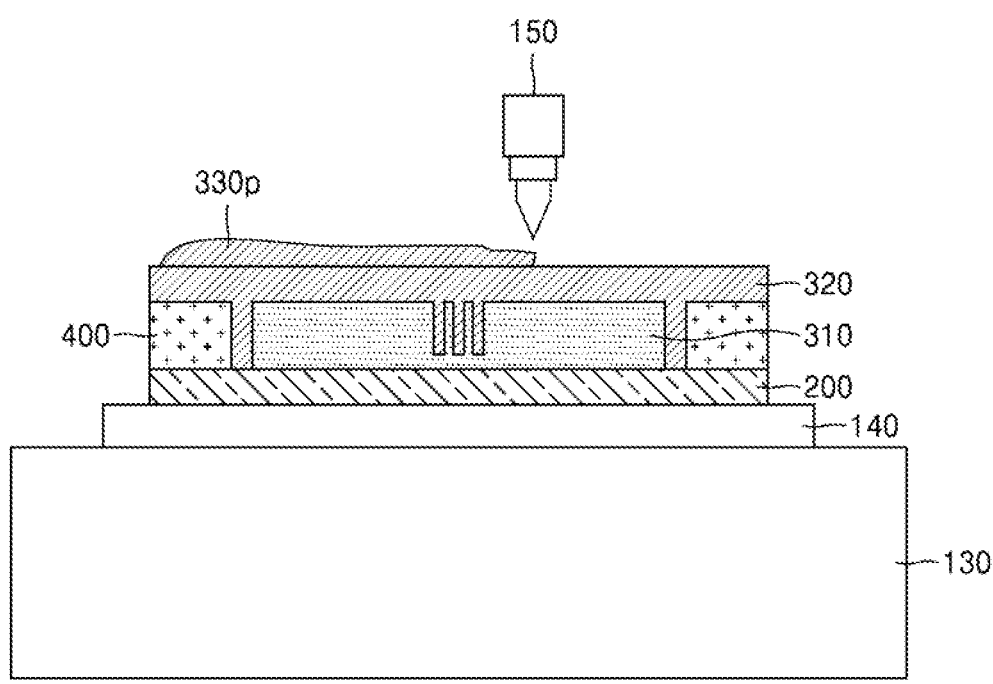
FIGS. 17 through 19 are cross-sectional views illustrating a method of manufacturing a window member, according to an embodiment of the disclosure.
Figure 18:
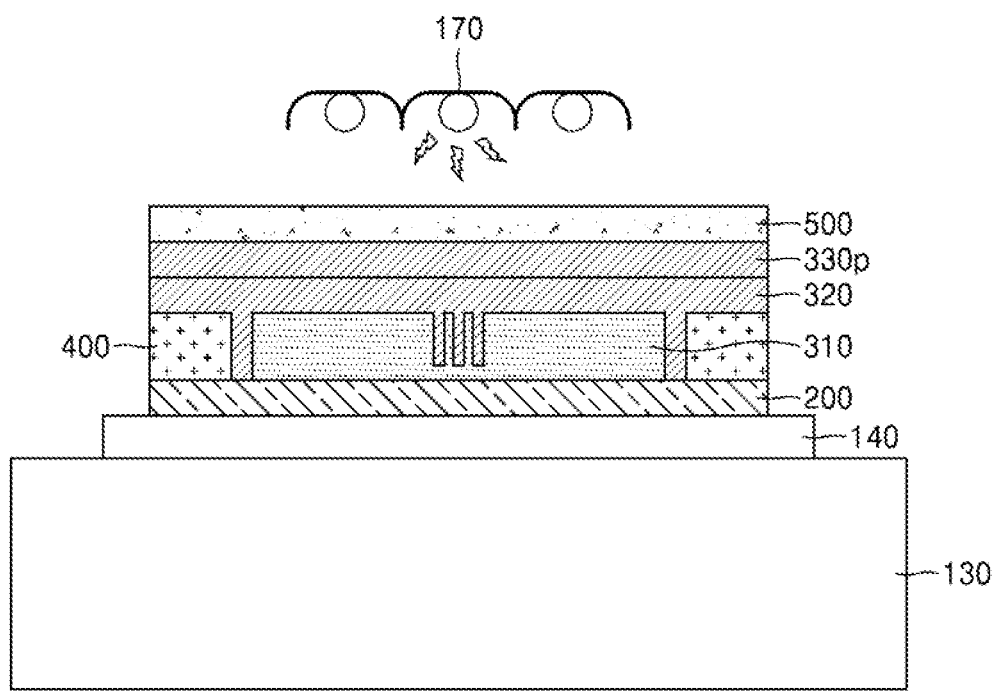
Figure 19:
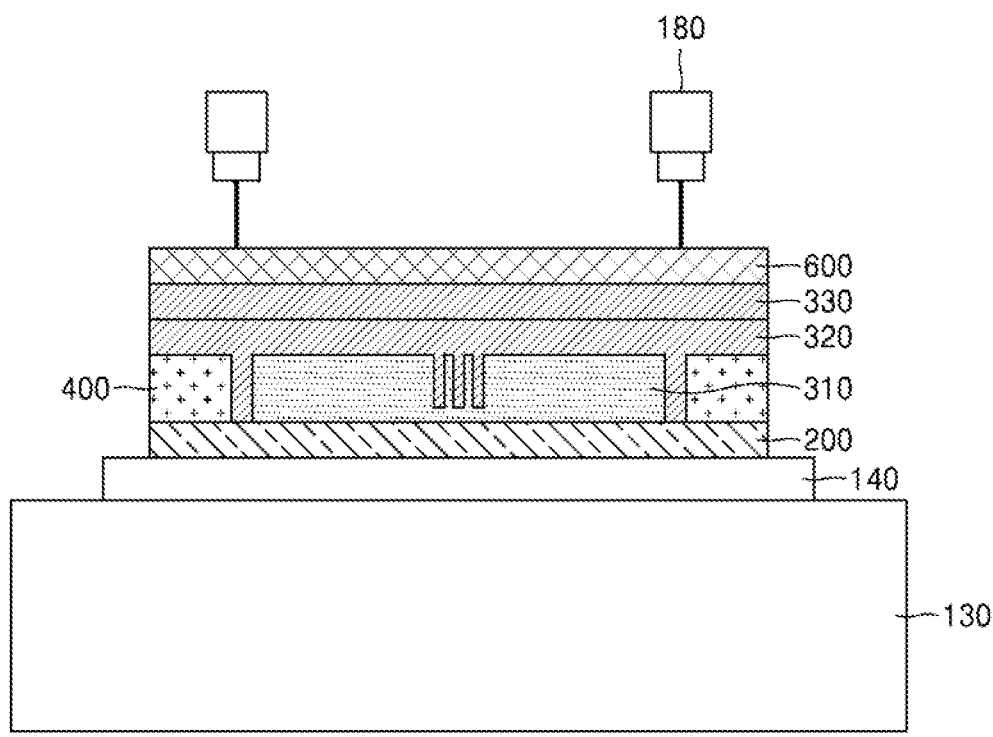

FIGS. 17 through 19 are cross-sectional views illustrating a method of manufacturing a window member, according to an embodiment of the disclosure.

Referring to FIG. 17, after the first protective layer 320 is formed as shown in FIG. 12, a second soft material 330p may be provided on the first protective layer 320. The second soft material 330p may be provided on the first protective layer 320 by using the dispenser 150 described above with reference to FIG. 1.

The second soft material 330p may be a material that is optically transparent and has physically low strength and low hardness. The second soft material 330p may be a flexible material. The second soft material 330p may be stretched or compressed by an external force. For example, the second soft material 330p may be a silicon-based resin, an Optically Clear Resin (OCR), or an Optically Clear Adhesive.

A modulus of the second soft material 330p may be less than that of the base substrate 310. The second soft material 330p may have substantially the same refractive index as the base substrate 310.

Next, the surface of the second soft material 330p may be planarized as shown in FIG. 18 by using the pressurizer 160 and the auxiliary substrate 500 shown in FIG. 10. The surface of the second soft material 330p may be planarized by using the pressurizer 160' shown in FIG. 16.

Next, referring to FIGS. 18 and 19, a second protective layer 330 may be formed on the first protective layer 320 by curing the second soft material 330p. After the second protective layer 330 is formed, the auxiliary substrate 500 may be removed.

The second soft material 330p may be exposed to ultraviolet light and/or heated by the curing machine 170, and the second soft material 330p may be cured thereby.

Next, referring to FIG. 19, the base substrate 310 may be divided by cutting at least a portion of the first protective layer 320 and at least a portion of the second protective layer 330. When the at least a portion of the first protective layer 320 and the at least a portion of the second protective layer 330 are cut, the protection film 600 may be attached onto the second protective layer 330 as shown in FIG. 10, and the protection film 600 may also be cut.

According to locations at which the first protective layer 320 and the second protective layer 330 are cut, a lateral surface of the base substrate 310 may be exposed or may be surrounded by the first protective layer 320.

Figure 20:
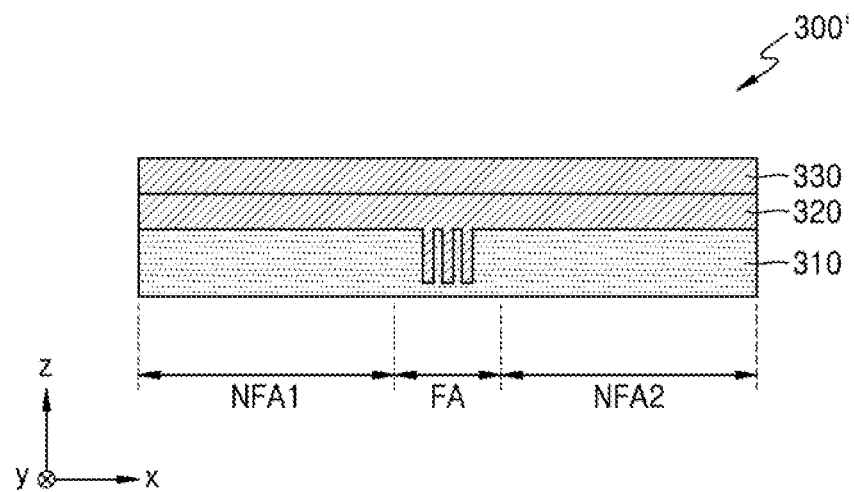
FIG. 20 is a schematic cross-sectional view of a window member according to an embodiment of the disclosure.

FIG. 20 is a schematic cross-sectional view of a window member according to an embodiment of the disclosure. FIG. 20 is a modification of FIG. 14, and is thus different therefrom in the structure of a second protective layer. Hereinafter, differences between the arrangements may be described and to the extent that an element is not described in detail, it may be assumed that the element is at least similar to corresponding elements that are described elsewhere within the instant disclosure.

Referring to FIG. 20, a window member 300' may include the base substrate 310, the first protective layer 320, and the second protective layer 330. The second protective layer 330 disposed on the first protective layer 320 may planarize the surface of the window member 300', and may increase the overall thickness of the window member 300'.

The first protective layer 320 and the second protective layer 330 may have substantially the same refractive index as the base substrate 310 for index matching. As such, when index matching between the first and second protective layers 320 and 330 and the base substrate 310 is achieved, the window member 300' may have increased permeability and increased clarity.

According to an embodiment, the first protective layer 320 and the second protective layer 330 are cut in the above-described manufacturing operation of FIG. 19 and the lateral surface of the base substrate 310 may be exposed.

According to an embodiment, the first protective layer 320 and the second protective layer 330 may be cut such that the lateral surface of the base substrate 310 is not exposed. For example, the lateral surface of the base substrate 310 may be surrounded by the first protective layer 320. When the lateral surface of the base substrate 310 is surrounded by the first protective layer 320, impact resistance of the lateral surface of the base substrate 310 may be reinforced by the first protective layer 320.

Figure 21:
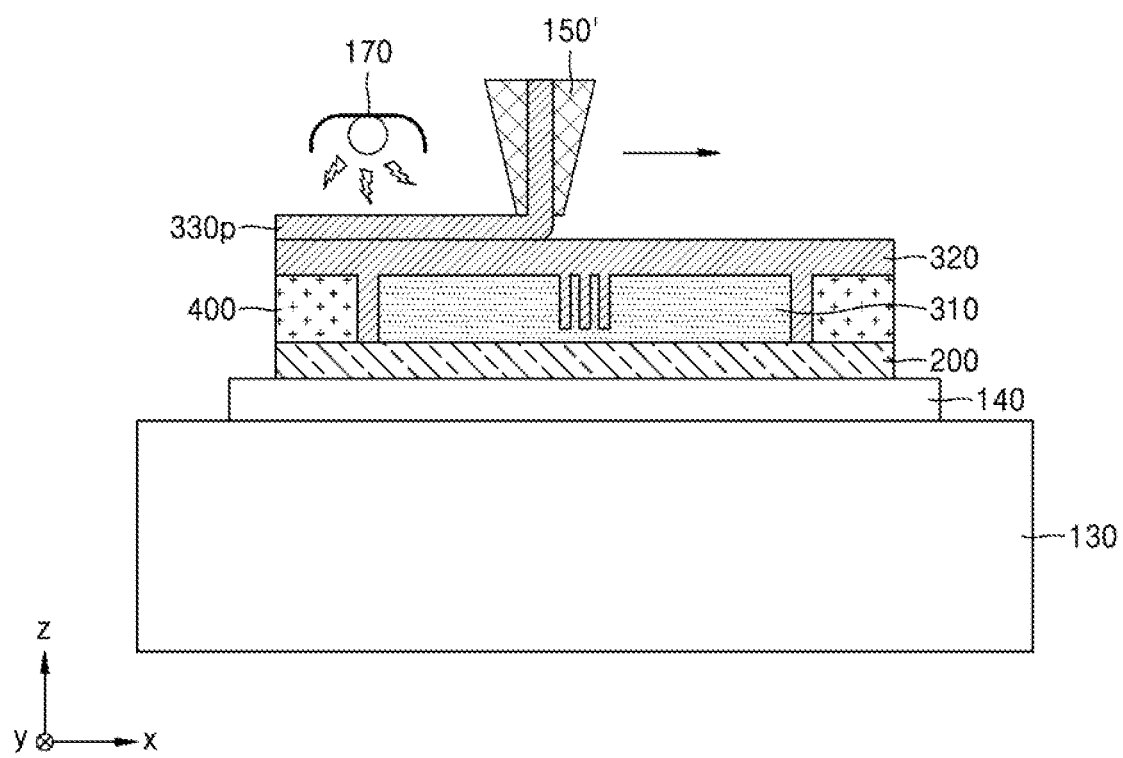
FIG. 21 is a cross-sectional view of a method of manufacturing a window member, according to an embodiment of the disclosure.

FIG. 21 is a cross-sectional view of a method of manufacturing a window member, according to an embodiment of the disclosure. FIG. 21 is a modification of FIG. 17, and is thus different therefrom in a process of providing a second soft material. Hereinafter, differences between the arrangements may be described and to the extent that an element is not described in detail, it may be assumed that the element is at least similar to corresponding elements that are described elsewhere within the instant disclosure.

Referring to FIG. 21, an operation of providing the second soft material 330p on the first protective layer 320 and an operation of curing the second soft material 330p may be performed substantially simultaneously.

For example, as shown in FIG. 21, while a dispenser 150' is moving in one direction, the second soft material 330p may be provided on the first protective layer 320. Next, the curing machine 170 may cure the second soft material 330p provided on the first protective layer 320. For example, the curing machine 170 may direct ultraviolet light to the second soft material 330p provided on the first protective layer 320 or may heat the second soft material 330p. As such, the second protective layer 330 of FIG. 20 may be formed by curing the second soft material 330p substantially simultaneously with providing of the second soft material 330p on the first protective layer 320.

According to an embodiment as described above, a device for and a method of manufacturing a window member having impact resistance and flexibility may be implemented. However, the scope of the disclosure is not necessarily limited thereto.

It should be understood that embodiments described herein should be considered in a descriptive sense. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the present disclosure.

What is claimed is:

1. A method of manufacturing a window member, the method comprising:
    disposing, on a support, a base substrate having a first surface in which a plurality of trenches are formed, a lengthwise direction of the plurality of trenches being a first direction;
    disposing a first soft material onto one side of the first surface of the base substrate;
    filling the plurality of trenches with the first soft material by moving a pressurizer in the first direction under a vacuum; and
    forming a first protective layer on the first surface of the base substrate and within the plurality of trenches by curing the first soft material.

2. The method of claim 1, further comprising disposing an auxiliary film on the support,
    wherein the auxiliary film surrounds at least a portion of the base substrate.

3. The method of claim 2, wherein the auxiliary film has an opening that at least partially surrounds the base substrate,
    wherein the opening includes a center area overlapping the base substrate, and a first auxiliary area extending from the center area in a second direction, and
    wherein an angle between the first direction and the second direction is equal to or greater than 0° and less than 90°.

4. The method of claim 3, wherein the opening further includes a second auxiliary area extending from the center area in a third direction intersecting the second direction, and
    wherein an angle between the first direction and the third direction is greater than 0° and less than 90°.

5. The method of claim 2, wherein a thickness of the auxiliary film is equal to or greater than a thickness of the base substrate.

6. The method of claim 1, wherein the first direction is parallel to the first surface of the base substrate.

7. The method of claim 1, wherein the filling of the plurality of trenches with the first soft material comprises:
    disposing an auxiliary substrate between the base substrate and the pressurizer;
    bringing into contact with the first soft material one side of a first surface of the auxiliary substrate facing the first surface of the base substrate; and
    moving the pressurizer from the one side of the first surface of the auxiliary substrate in the first direction on the auxiliary substrate.

8. The method of claim 7, wherein, while the pressurizer is moving in the first direction, an angle between the first surface of the auxiliary substrate and the first surface of the base substrate decreases.

9. The method of claim 1, wherein the curing of the first soft material includes exposing the first soft material to ultraviolet light and/or heating the first soft material.

10. The method of claim 1, further comprising cutting at least a portion of the first protective layer.

11. The method of claim 1, further comprising forming a second protective layer on the first protective layer.

12. The method of claim 1, wherein a refractive index of the first protective layer is substantially the same as a refractive index of the base substrate.

13. The method of claim 1, wherein a length of each of the plurality of trenches in the first direction is less than or equal to a width of the base substrate in the first direction.

14. The method of claim 1, wherein a depth of each of the plurality of trenches is less than or equal to a thickness of the base substrate.

15. The method of claim 1, wherein a first non-folding area, a second non-folding area, and a folding area disposed between the first non-folding area and the second non-folding area are defined in the base substrate, and
    wherein the plurality of trenches are disposed within the folding area.

16. A method of manufacturing a window member of a display device, the method comprising:
    evacuating a chamber;
    depositing an optically transparent fluid material onto a substrate within the evacuated chamber;
    pressing the optically transparent fluid material over a top surface of the substrate to fill a plurality of trenches of the top surface of the substrate with the fluid material, within the evacuated chamber; and
    curing the pressed optically transparent fluid material, within the evacuated chamber.

17. The method of claim 16, wherein the pressing is performed by a roller that is rolled across the top surface of the substrate.

18. The method of claim 16, wherein the curing is performed by exposing the optically transparent fluid material to light and/or heat.

* * * * *